US007826343B2

(12) United States Patent
Krasner

(10) Patent No.: US 7,826,343 B2
(45) Date of Patent: Nov. 2, 2010

(54) POSITION LOCATION SIGNALING METHOD APPARATUS AND SYSTEM UTILIZING ORTHOGONAL FREQUENCY DIVISION MULTIPLEXING

(75) Inventor: Norman F. Krasner, Emerald Hills, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1007 days.

(21) Appl. No.: 10/935,833

(22) Filed: Sep. 7, 2004

(65) Prior Publication Data

US 2006/0050625 A1    Mar. 9, 2006

(51) Int. Cl.
*H04J 11/00* (2006.01)
(52) U.S. Cl. .................................. 370/208; 370/203
(58) Field of Classification Search ................. None
See application file for complete search history.

(56) References Cited

U.S. PATENT DOCUMENTS

| 5,644,573 | A | * | 7/1997 | Bingham et al. ............ 370/503 |
| RE38,808 | E | * | 10/2005 | Schuchman et al. ..... 342/357.12 |
| 2002/0147978 | A1 | * | 10/2002 | Dolgonos et al. ............. 725/62 |
| 2003/0008664 | A1 | | 1/2003 | Stein et al. |
| 2003/0162547 | A1 | * | 8/2003 | McNair ..................... 455/456 |
| 2004/0086027 | A1 | * | 5/2004 | Shattil ........................ 375/146 |

FOREIGN PATENT DOCUMENTS

EP    0613021    8/2004

OTHER PUBLICATIONS

Progri, Michalson, Cyganski: "An OFDM/FDMA Indoor Geolocation System" Navigation. Journal of the Institute of Navigation. vol. 51, No. 2 (Jun. 1, 2004); pp. 1-10.
Marc Engels: "Wireless OFDM Systems" Jan. 1, 2002, Kluwer, USA, pp. 37-38.
Ramjee Prasad, Marina Ruggieri: "Technology Trends in Wireless Communications" Jan. 1, 2003, Artech House, USA, pp. 57-62.
International Search Report—PCT/US05/032017. International Search Authority—European Patent Office—Jan. 26, 2006.
Written Opinion—PCT/US05/032017, International Search Authority—European Patent Office—Jan. 26, 2006.
International Preliminary Report on Patentability—PCT/US05/032017—The International Bureau of WIPO—Geneva, Switzerland—Mar. 13, 2007.

* cited by examiner

*Primary Examiner*—Raj Jain
(74) *Attorney, Agent, or Firm*—Shyam K. Parekh

(57) ABSTRACT

Position location signaling system, apparatus, and method are disclosed. Position location beacons can each be configured to transmit a frequency interlaced subset of orthogonal frequencies spanning substantially an entire channel bandwidth. The orthogonal frequencies can be pseudorandomly or uniformly spaced, and each beacon can be allocated an equal number of orthogonal frequencies. Each frequency of the interlaced subset of orthogonal frequencies can be modulated with an element of a predetermined data sequence. A mobile device can receive one or more of the beacon signals and determine a position using a position location algorithm that determines position in part on an arrival time of the beacon signal. Where the mobile device can receive three or more beacon signals, the mobile device can perform position location by trilateration to the beacon positions based, for example, on a time difference of arrival.

25 Claims, 10 Drawing Sheets

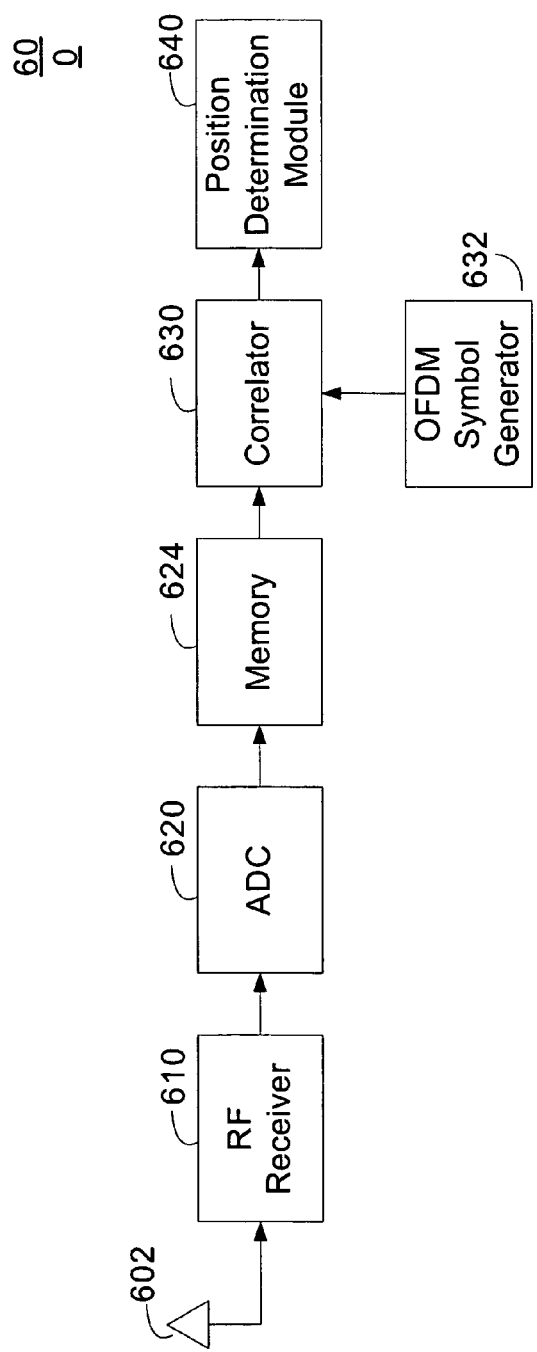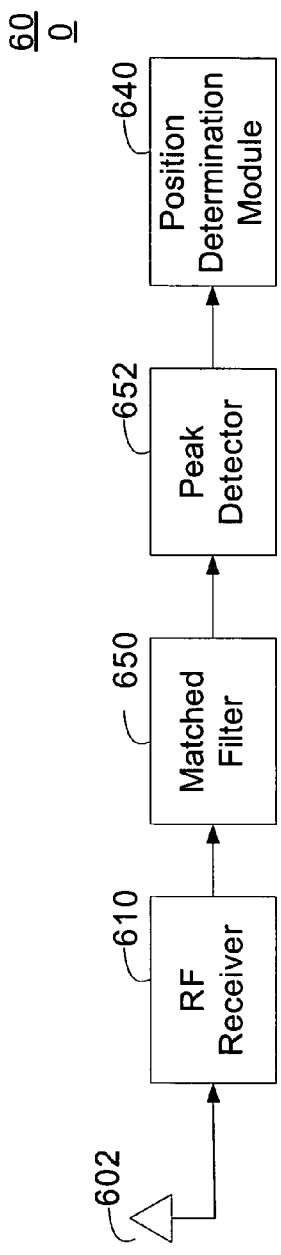
FIG. 6A
FIG. 6B

POSITION LOCATION SIGNALING METHOD APPARATUS AND SYSTEM UTILIZING ORTHOGONAL FREQUENCY DIVISION MULTIPLEXING

FIELD

The disclosure relates to the field of position location. More particularly, the disclosure relates to wireless position location systems, signaling, and devices.

BACKGROUND

In many applications it may be advantageous to have the ability to determine a position of a mobile device. Position location may be helpful for navigation, tracking, or orientation applications. The continual advancement of the performance of portable electronics, particularly the advancements in the performance of processors, allows position location capabilities to be added in a variety of devices.

For example, it may be desirable for an operator of a mobile telecommunications system such as a cellular telecommunications system to be able to determine the position of a mobile handset during communication with a base transceiver station (BTS) of the system. A system operator may desire position location capabilities, for example, to satisfy the U.S. Federal Communications Commission (FCC) E911 emergency position location mandate.

Mobile devices may implement one or more position location techniques depending on the position location signaling methods used in the position location system. For example, a mobile device may use time of arrival (TOA), time difference of arrival (TDOA), advanced forward link trilateration (AFLT) or some other position location technique. Examples of position location systems include those that are based on the Global Positioning System (GPS), those that augment the GPS system with terrestrial based beacons such as Assisted GPS systems, and terrestrial based beacon position location systems.

Most terrestrial ranging systems incorporate a pseudo noise (PN) code in a direct sequence spread spectrum configuration. A mobile device can identify a particular source, in part, by correlating a received PN spread signal with an internally generated version. Unfortunately, PN codes typically exhibit modest cross correlation properties unless very long PN codes are used. However, the use of long PN codes increase the complexity, bandwidth, or time required to obtain a position location fix. Additionally, because a mobile station in a terrestrial based system can receive widely disparate signal powers, even relatively low cross correlation properties can interfere with the mobile station's ability to identify signal sources.

Therefore, it is desirable to have a position location signaling technique, system, and device that allow for high performance position location in a variety of conditions and yet may be implemented in a practical manner.

SUMMARY

Position location signaling system, apparatus, and method are disclosed. Position location beacons can be configured to transmit an interlaced subset of orthogonal frequencies spanning substantially an entire channel bandwidth. The subset of orthogonal frequencies are preferentially pseudorandomly spaced; however, uniform spacing may be used. Each beacon can be allocated an equal number of orthogonal frequencies. Adjacent beacons can be assigned mutually exclusive subsets of orthogonal frequencies. Each frequency of the interlaced subset of orthogonal frequencies can be modulated with an element of a predetermined data sequence. A mobile device can receive one or more of the beacon signals and determine a position using a position location algorithm that determines position in part on an arrival of the beacon signal. Where the mobile device can receive three or more beacon signals, the mobile device can perform position location by trilateration to the beacon positions based, for example, on pseudoranges or a time difference of arrival.

One aspect includes a method of generating position location signals. The method includes defining a plurality (Q) of orthogonal frequencies, selecting a subset of orthogonal frequencies from the plurality of orthogonal frequencies, generating an Orthogonal Frequency Division Multiplex (OFDM) symbol based on the subset of orthogonal frequencies, and transmitting the OFDM symbol.

Another aspect includes a method of generating position location signals. The method includes defining a plurality (Q) of orthogonal frequencies, defining a number (M) of distinct position location signals, generating M subsets of orthogonal frequencies from the plurality of orthogonal frequencies, generating an OFDM symbol corresponding to at least one of the M subsets, and transmitting the OFDM symbol periodically over a wireless communication system.

Yet another aspect includes a method of generating position location signals. The method includes generating a frequency interlaced OFDM signal from a subset of orthogonal frequencies, repeating at least a portion of the OFDM signal at least once to generate a redundant OFDM signal ("cyclically extending" the signal), synchronizing the redundant OFDM signal to a time reference, and wirelessly transmitting the redundant OFDM signal.

Yet another aspect includes a position location signal generating apparatus. The apparatus includes means for generating at least one of M subsets of orthogonal frequencies from a plurality of Q orthogonal frequencies, means for generating an OFDM symbol corresponding to at least one of the M subsets, and means for transmitting the OFDM symbol periodically over a wireless communication system.

Yet another aspect includes a position location signal generating apparatus. The apparatus includes means for generating a frequency interlaced OFDM signal from a subset of orthogonal frequencies, means for synchronizing the OFDM signal to a time reference, and means for wirelessly transmitting the OFDM signal.

Yet another aspect includes a position location signal generating apparatus. The apparatus includes an orthogonal signal generator configured to generate at least a subset of orthogonal carriers out of a larger set of Q orthogonal frequency carriers, an OFDM modulator having an input coupled to the orthogonal signal generator, and configured to generate an OFDM symbol based in part on the subset of orthogonal carriers, and a transmitter coupled to the OFDM modulator and configured to wirelessly transmit the OFDM symbol.

Yet another aspect includes a method of position location. The method includes receiving an OFDM signal, determining a received OFDM symbol from the OFDM signal, and determining a location based at least in part on the OFDM symbol.

Yet another aspect includes a mobile device configured for position location. The device includes a receiver configured to receive an OFDM signal, a correlator configured to correlate the received OFDM signal with one of a plurality of frequency interlaced OFDM symbols, and a position location module configured to determine a location based in part on an output of the correlator if at least one frequency interlaced OFDM symbol correlates with the received OFDM signal.

In another aspect an OFDM position location symbol, or a multiplicity of such symbols, are transmitted in a time multiplexed manner with a OFDM communication signal or signals. Periodically, or on demand, the OFDM communication signal is interrupted and an OFDM position location signal is substituted.

BRIEF DESCRIPTION OF THE DRAWINGS

The features, objects, and advantages of the various embodiments described herein will become more apparent from the detailed description set forth below when taken in conjunction with the drawings, in which like elements bear like reference numerals.

FIGS. 6A-6C are functional block diagrams of embodiments of frequency interlaced OFDM position location receivers

DETAILED DESCRIPTION

Figure 1:
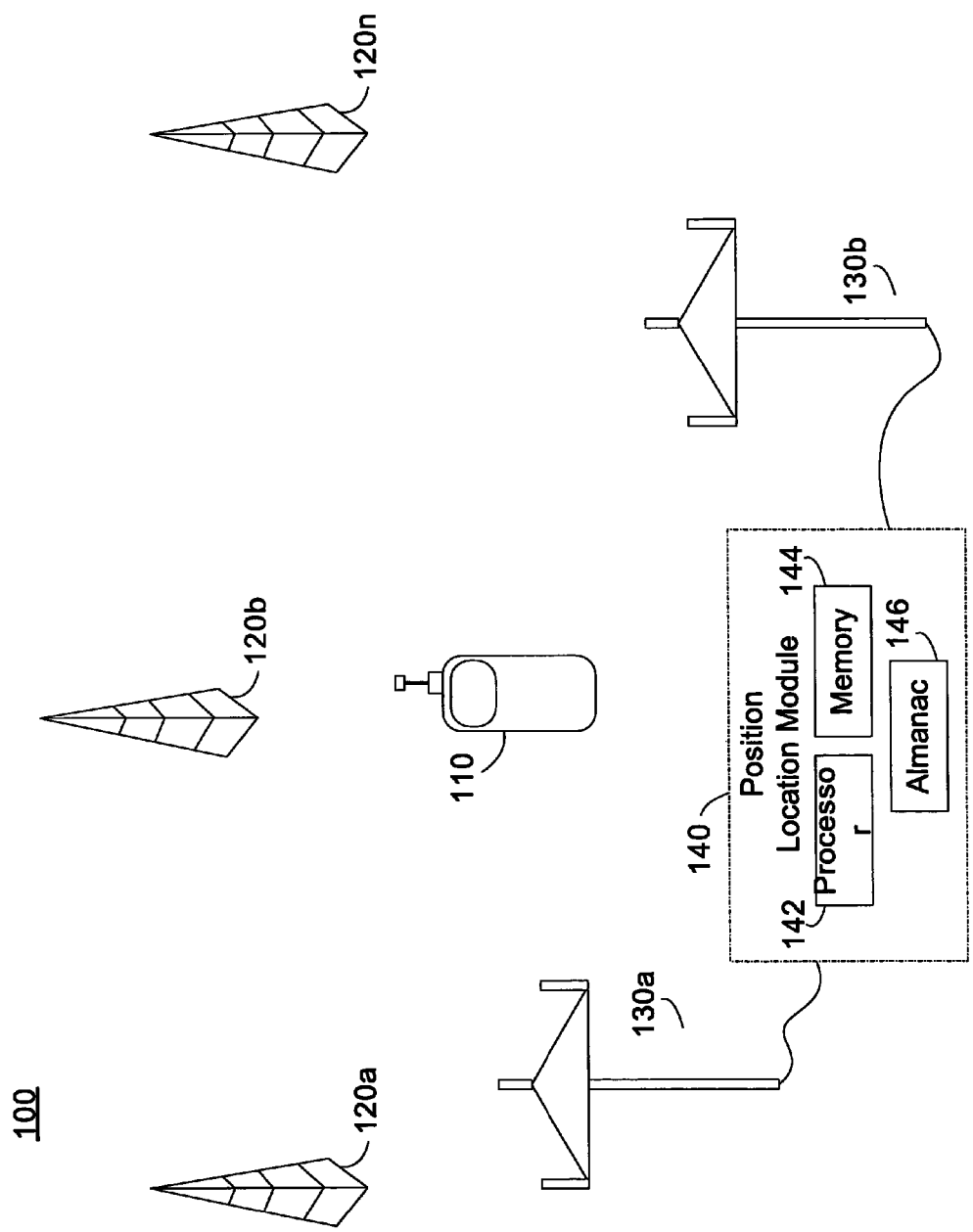
FIG. 1 is a functional block diagram of an embodiment of a frequency interlaced OFDM position location system.

A position location signaling system, apparatus, and method based upon an Orthogonal Frequency Division Multiplexing (OFDM) concept are disclosed. The approach provides improved orthogonality between simultaneously received position location signals with large received power differences. The advantages are significant as compared to alternative configurations such as the use of direct sequence spread spectrum signaling, utilizing pseudorandom sequences, such as Gold codes.

The beacon in the disclosed position location signaling system preferably uses a wide signal bandwidth to improve a time resolution achievable at a receiver. Broadband signals also allow for the use of sophisticated multipath mitigation techniques. A position location system that is configured to interface with an existing communication system can be configured to allocate substantially an entire channel bandwidth or multiple channel bandwidths for position location signals.

The position location signals are generated by defining a set of orthogonal frequencies spanning the available signal bandwidth. A set of "orthogonal" frequencies is used herein to mean that the frequency separation between admissible carrier frequencies of the set are multiples of a frequency difference w, where w=1/T Hz, where T is the minimum period associated with symbols constructed as a superposition of carriers having these frequencies.

As a further explanation, if two symbols are constructed from disjoint sets of orthogonal frequencies, with frequency difference w, then the cross-correlation between the symbols, integrated over period T=1/w, would ideally be zero. In some cases the symbol periods of these symbols may be restricted to this period T. In other cases the symbol period is extended beyond the period T, by appending to the end of the symbol a portion of the symbol at its beginning. This extension of the symbol period is referred to as "cyclic extension." Similarly a portion of the symbol at the end may be appended to the beginning of the symbol, again producing a cyclic extension. A combination of the two methods of appending may be utilized and, alternatively, the symbol of length T may be repeated a multiplicity of times, thus creating a very long cyclic extension.

The period T is referred to as the "basic symbol period" and the symbol that is extended as the "transmitted symbol period." In OFDM systems used for communications the period T is referred to as the "information symbol period." Normally, in this disclosure the terminology "OFDM symbol" refers to the transmitted symbols—that is the symbols, including any cyclic extension that may be employed. Regardless of the length of the transmitted symbol period, a receiver observing symbols designed to be orthogonal over the period T, will normally only have zero cross correlation with respect to one another if the cross correlation is performed over a period of T or an integer multiple thereof (assuming the symbols are extended for multiple periods).

The term "pseudorandom sequence" is used herein to refer to a sequence of numbers determined by an algorithm whose characteristics approximate a random sequence of numbers. Examples of such pseudorandom sequences include maximal length sequences and Gold code sequences, although many other such sequences exist. Similarly, the term "pseudorandomly spaced" is used to mean that the spacing between elements of an series or array is determined according to some pseudorandom sequence.

Multiple orthogonal frequency subsets are then defined from the set of orthogonal frequencies as subsets having disjoint frequencies relative to one another. Each of the subsets can have an equal, or at least comparable, number of frequencies. A symbol constructed from a superposition of carriers with frequencies in a given orthogonal frequency subset will be orthogonal (over the period T) to a symbol constructed from carriers from a different orthogonal subset. Each of the frequencies in a particular subset of orthogonal frequencies can be modulated or otherwise modified, as long as the orthogonality is maintained. Typical modulations used upon each of the frequency carriers include phase shift keying and QAM modulation, although for position location purposes it is expected that simple binary or a nonbinary modulation, such as quaternary phase shift keying would be preferred. Normally the modulation of the frequencies is held constant during a symbol period in order to maintain orthogonality.

In an embodiment, data encoded upon one orthogonal frequency subset are chosen to be substantially uncorrelated with that of another orthogonal frequency subset. This approach produces a two-dimensional orthogonal coding that leads to improved system performance.

One subset of orthogonal frequencies can be assigned to a particular position location beacon. Multiple beacons can be configured to periodically and concurrently transmit their respective subset of orthogonal frequencies. In one embodiment, the beacons can be terrestrial transmitters.

A mobile device can be configured to receive the concurrently transmitted position location signals from one or more of the position location beacons. The mobile device can then determine its location based in part on the received position location signals. The mobile device can determine its position, for example, using a time difference of arrival process or a trilateration process that determines pseudoranges to the transmitting beacons. The receiver in the mobile device can identify the various transmitted position location signal subsets even in the situation where the position location signal from a first beacon is received at power levels many orders of magnitude stronger than the received power of the position location signal from another beacon. The receiver performance is achievable because of the low cross correlation properties associated with the disclosed position location signals.

FIG. 1 is a functional block diagram of an embodiment of a frequency interlaced OFDM position location system 100. The position location system 100 can include a first communication system having a plurality of position location beacons 120a-120n configured to transmit corresponding orthogonal multiplexed position location signals. The position location system 100 may also include a second communication system having one or more base stations 130a and 130b. In one embodiment, each of the base stations 130a and 130b can be coupled to a position location module 140.

The position location module 140 can include a processor 142 coupled to memory 144 and an almanac 146 configured to store the locations and other information (for example frequency subset information) of one or more of the position location beacons 120a-120n. The position location module 140 can be configured to determine, or assist in determining the position of a mobile device, such as mobile device 110, operating within the position location system 100. In some embodiments of the system 100, the position location module 140 is omitted and the mobile device 110 can determine its location based in part on the received signals without external assistance.

In an embodiment of the system 100, the first communication system can be an existing terrestrial communication system and the position location signals can be broadcast in addition to the existing communication signals. Although only three position location beacons 120a-120n are shown in FIG. 1, any number of beacons may be included in a system and a mobile device 110 at any given instant in time may have the ability to receive from all or less than all of the position location beacons 120a-120n. For example, the first communication system may be a television broadcast system, radio broadcast system, or wireless Local Area Network (LAN) system and existing broadcast antennae can be configured as position location beacons 120a-120n. In other embodiments of the system 100, one or more of the position location beacons 120a-120n can be satellite beacons, aircraft based beacons, or some other non-terrestrial beacon.

In an embodiment of the system 100, the second communication system can be a wireless communication system, such as a wireless telephone system, and the base stations 130a-130b can be wireless telephone base stations. The wireless phone system can be, for example, a Code Division Multiple Access (CDMA) cellular phone system, a GSM cellular phone system, a Universal Mobile Telecommunications System (UMTS), or some other system for wireless communications. Although only two base stations 130a-130b are shown, any number of stations can be implemented in a particular communication system.

The mobile device 110 can be a wireless receiver or a wireless transceiver and can be, for example, a wireless phone, cellular phone, cordless phone, radio, position location device, personal digital assistant, personal communication device, wireless LAN device, or some other device receiving position location signals. Because the mobile device 110 can be configured as many different types of devices, the mobile device 110 may alternatively be referred to as a mobile station (MS), mobile unit, user terminal, user device, or portable device.

In one embodiment, each of the position location beacons 120a-120n can be configured to periodically or continuously transmit a corresponding interlaced subset of frequencies as discussed above and further detailed below. A mobile device 110 within the position location system 100 can be configured to receive the position location signals broadcast by one or more of the position location beacons 120a-120n. The mobile device 110 can be configured to correlate or otherwise detect received position location signals that are above a detection threshold.

In embodiments where the position location beacons 120a-120n periodically transmit the position location signals, the position location beacons 120a-120n should be configured to transmit the position location signals substantially concurrently in order to minimize the amount of time that the mobile device 110 needs to listen for the signals. Position location is simplified if the transmissions from the position location beacons 120a-120n are synchronized.

In one embodiment, it may be desirable to permit positioning to an accuracy of 30 meters. To achieve this level of accuracy, the timing errors between the position location beacon 120a-120n transmissions should be kept below 100 nanoseconds. This, however, does not take into account any other sources of errors, such as measurement errors and geometry induced error increases, such as those attributable to position dilution of precision (PDOP). Therefore, it may be desirable for the system 100 to maintain the transmission errors to below 50 nanoseconds relative to one another. If this is not practical, then of course the ultimate accuracy will scale accordingly. It may be possible to calibrate the position location beacon 120a-120n timing errors, if they are constant, by utilizing the mobile device 110 to determine such errors, assuming that GPS position location and time-of-day solutions are available within the MS. Hence, it may be important to minimize the change in transmission timing, or beacon synchronization, versus time.

It may be advantageous for the transmissions from the position location beacons 120a-120n to contain a data channel that provides information about the various other position location beacons 120a-120n present within the vicinity. For example, this information may be broadcast at a very low rate on some type of supplementary channel. Information of interest can include the code numbers and locations of the position location beacons 120a-120n in an area. The information may include a type of "almanac" and perhaps other auxiliary information, such as transmission power, or other factors.

Complete timing and position location upon beacons 120a-120n can allow the mobile device 110 to compute its position based upon this information. If this information is not transmitted by the position location beacons 120a-120n, it may still possible to locate the mobile device 110 using information transmitted on another channel, such as a cellular channel. For example transmitters 130a and 130b may provide this information. In this latter case, the cellular channel could send an almanac of position location beacon 120a-120n information.

The mobile device 110 may determine its location independently or may use the assistance of another module, such as the position location module 140 to determine its position. Returning ranging information to a network entity or server such as the position location module 140 can also require messaging. In one embodiment, the data could be encoded as some type of transmitter ranging data (for example, so-called AFLT in the CDMA2000 cellular standard), whose format is already supported in the second communication system. For example, the format could be in accordance with IS-801 where the second communication system is a CDMA communication system. Alternatively, some other type of new data packet could be transmitted. Current hybrid GPS/AFLT positioning performed within the IS-801 standard does not directly support the inclusion of other ranging measurements, such as those described herein, nor for the transmission of almanac data for non-cellular base stations in a standardized way. However, such information may be transmitted on a variety of data channels supported within such a standard.

In one embodiment the mobile device 110 can determine a pseudorange to each of the position location beacons 120a-120n corresponding to the received position location signals. A pseudorange is simply a time-of-arrival of a received signal together with an unknown time bias present in the receiver. The time bias may be determined as part of the position location procedure. The mobile device 110 can then determine its location based in part on the determined pseudoranges.

In another embodiment, the mobile device 110 can determine a time difference of arrival based on a pair of received position location signals, e.g. signals from 120a and 120b. The time difference of arrival then determines a curve, such as a hyperbola, on which the mobile device 110 is located. The mobile device 110 can determine another curve based on a different pair of received position location signals, for example 120b and 120n, and can determine its location, based in part, on the intersection of the curves.

In still another embodiment, the mobile device 110 can determine a pseudorange to each of the position location beacons 120a-120n corresponding to the received position location signals. The mobile device 110 can then transmit the pseudorange information and corresponding position location beacon identification to one or more base stations, for example 130a, of a second communication system. The base station 130a can then communicate the pseudorange and beacon identification information to a position location module 140. The position location module 140 can be configured to determine the location of the mobile device 110 based in part on the information provided by the mobile device 110.

In still other embodiments, the mobile device 110 can independently determine its location based on some other position location process. In still other embodiments, the mobile device 110 can determine its location, the position location module 140 can determine the location of the mobile device 110, or the mobile device 110 in combination with the position location module 140 can determine the position of the mobile device 110 using a shared process.

Figure 2:
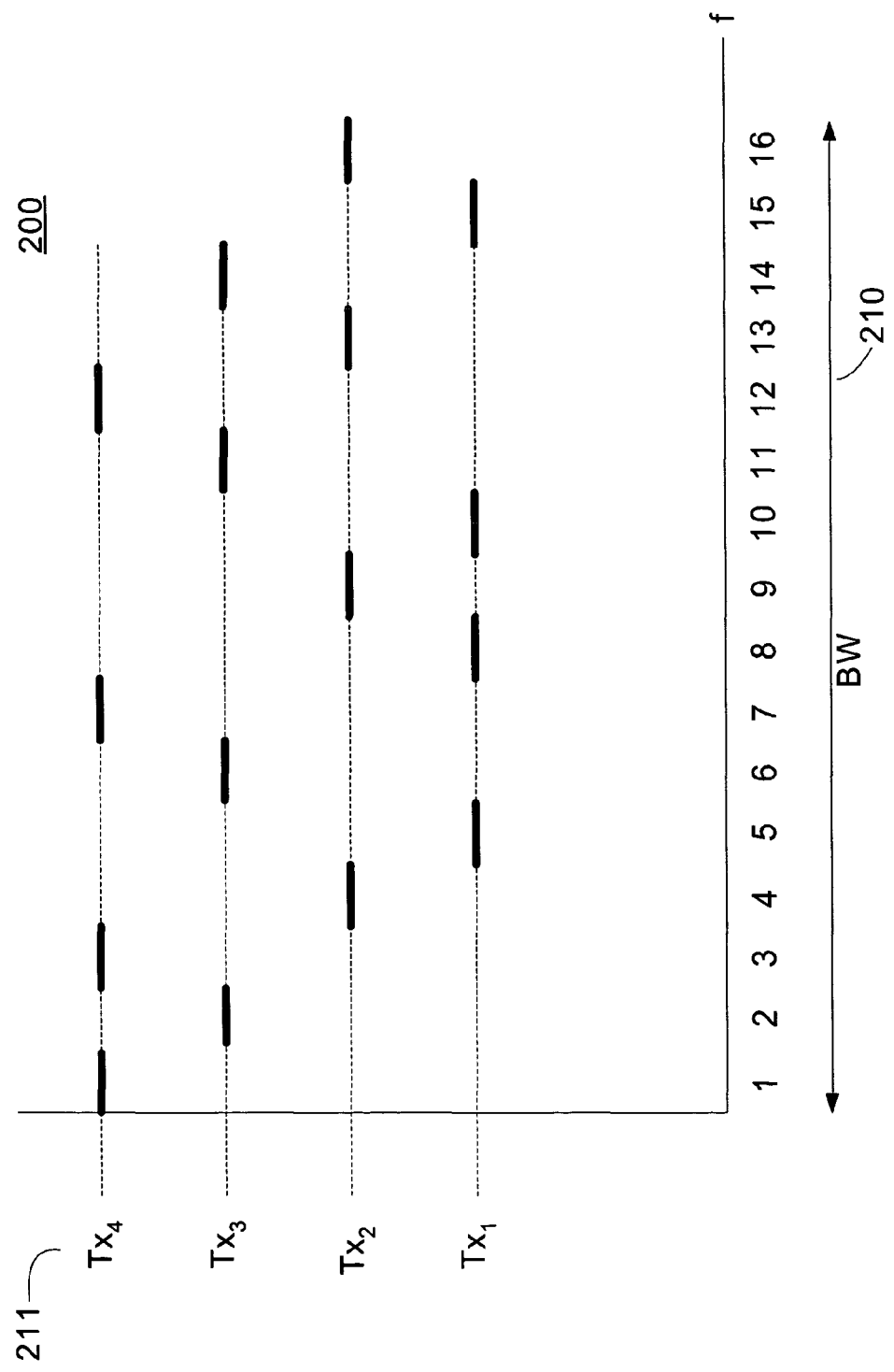
FIG. 2 is a functional diagram of an embodiment of the frequency spectrum of a pseudorandom interlaced OFDM spectrum.

FIG. 2 is a functional diagram of an embodiment of a frequency spectrum of a pseudorandom interlaced orthogonal frequency spectrum 200. The frequency spectrum 200 shows an overall signaling bandwidth 210 that can correspond to substantially a bandwidth of one or more channels in a communication system or can correspond to a bandwidth allocated for position location signaling.

The orthogonal frequencies used for position location signaling are generated within the overall signaling bandwidth 210. The signaling frequencies assigned to a given transmitter are shown as bold horizontal lines to the right of the transmitter numbers. For example transmitter $Tx_4$ (211) is assigned frequencies 1, 3, 7, and 12. Although the frequency spectrum 200 in FIG. 2 only depicts four different signaling frequency subsets corresponding to four different position location signals, the process can be generalized to any number M of position location signals. Initially, Q orthogonal carriers are defined within the overall signaling bandwidth 210. In the example shown in FIG. 2, the number of orthogonal carriers Q is equal to sixteen.

Each of the M position location signals can be constructed from a subset of the Q total orthogonal carriers. The M position location signals can be constructed by assigning a subset, q=Q/M, of carriers to each of the M signals: In one embodiment, q=Q/M is an integer and all position location signals are an equal number of carriers. In other embodiments, the number of carriers assigned to each of the position location signals is not equal.

In an embodiment where Q/M is an integer, the first position location signal is an orthogonal frequency multiplexed signal that can be chosen by initially randomly (or pseudo-randomly) selecting a first carrier from the set of Q orthogonal carriers. The selected carrier is then removed from a list of available carriers. A second carrier is randomly selected from the remaining Q-1 carriers. That carrier is then also removed from the list of available carriers. The process is continued in this manner until Q/M carriers are selected and assigned to the first position location signal. Next Q/M carriers are randomly selected for the second position location signal from the remaining Q-Q/M carriers. This procedure is continued until all M multiplexed position location signals are assigned Q/M carriers. In this embodiment, the M subsets of carriers assigned to each of the M multiplex signals are disjoint, or mutually exclusive, from one another. The orthogonality of the individual carriers ensures orthogonality of the position location signals to one another, assuming perfect time and frequency synchronization. This procedure for assigning frequencies to position location signals may be repeated, with use of a new randomized sequence, if it does not result in signal with desirable properties, for example, autocorrelation properties with peak to sidelobe ratio greater than some predetermined threshold.

In the example illustrated in FIG. 2, the total number of carriers, Q, is equal to sixteen and the number of position location signals, M, is four. Thus, each position location signal includes a subset of Q/M=4 separate orthogonal carriers. A first position location signal is assigned carriers numbered 1, 3, 7, and 12. A second position location signal is assigned carriers numbered 2, 6, 11, and 14. A third position location signal is assigned carriers numbered 4, 9, 13, and 16. The fourth and final position location signal of this example is assigned carriers numbered 5, 8, 10, and 15.

In another embodiment, the Q/M carriers for at least one of the position location signals are uniformly spaced throughout the overall signal bandwidth. A consequence of replacing random frequency interlacing with a uniform interlacing is approximately an M fold autocorrelation ambiguity. A uniform carrier spacing results in an autocorrelation function repeating with a time interval of $T_s/M$, where $T_s$ is the basic OFDM symbol period (without cyclic extension) and is the reciprocal of carrier spacing. A uniform carrier spacing can result in reduced cross correlation between sets with adjacent frequencies and reduce the unambiguous delay range compared to an embodiment having random or pseudo random carrier spacing. Nevertheless, in some situations such a uniform spacing may be desirable for implementation reasons, or required based upon system constraints.

The position location signal transmitted by a beacon is generated using one or more of the subsets of carrier frequencies. To generate the position location signal, signaling data is assigned to each of the M carrier subsets, each of size Q/M carriers. Typically, the signaling data takes the form of a specified carrier phase, relative to other carrier phases at the beginning of an OFDM symbol period. Thus, in this case a vector of Q/M carrier phases is the signaling data associated with one OFDM symbol of a given carrier subset. However, it is also possible to utilize signaling data containing both carrier phase and amplitude information, for example, quadrature amplitude modulation (QAM). Normally the signal information assigned to a given carrier is held constant over the OFDM symbol period, in order to maintain orthogonality between differing carriers over the time period $T_s$.

In one embodiment, M random or pseudorandom binary sequences are defined, and each of the sequences is assigned as a data vector to one of the M carrier subsets. The binary sequences can be used as a data source whose elements are used to assign the phases of the various carriers. Each bit in the binary sequence can correspond to a constant phase applied to each of the carriers in the corresponding subset. In this embodiment, the phase of each carrier remains fixed over an OFDM symbol period. It may be advantageous to select the binary sequences from a special class or sequences, such as maximal length PN sequences, Barker codes, Walsh codes, or Gold Codes having a length truncated to or extended to Q/M. Notice that the binary sequences described in this paragraph are not used to directly modulate a signal versus time, but are used to modulate a set of carriers versus frequency. Another way to visualize this process is that the OFDM symbol is a linear combination of carriers that belong to a specified subset. The coefficients of the linear combination are the binary or higher order sequences discussed above. For full generality then, i.e. to produce phase and amplitude modulation, these sequences are complex numbers.

Thus, there can be at least two levels of randomization for each of the position location signals. A first level of randomization includes a random frequency interleaving of M signals, and a second level of randomization includes a random assignment of phases (or amplitudes and phases) to the respective Q/M frequencies of each of the M signals. In other embodiments, the binary (or higher order) sequence data source may vary with time (for example, may vary from one OFDM symbol to the next) and thus, each of the carriers may be modulated with a time varying data stream. Normally, however, that sequence data is still held fixed, or nearly fixed, over each individual OFDM symbol period. Otherwise orthogonality of the OFDM symbols will not be maintained.

Each of the M composite signals described in the above embodiments can be concurrently transmitted from a corresponding one of M distinct position location beacons as an OFDM symbol.

Figure 3:
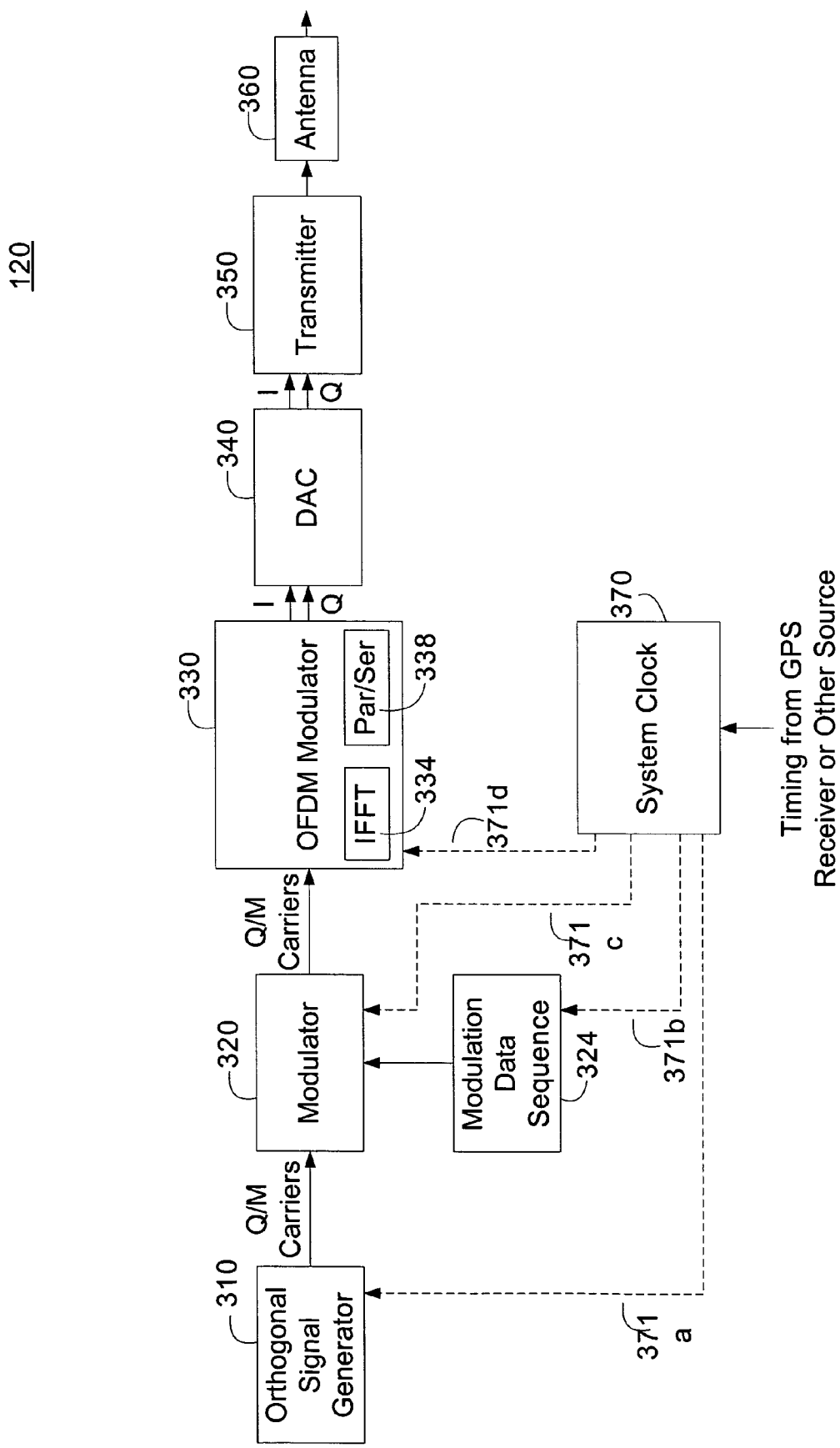
FIG. 3 is a functional block diagram of an embodiment of a frequency interlaced OFDM position location transmitter.

FIG. 3 is a functional block diagram of an embodiment of a frequency interlaced orthogonal frequency position location beacon 120. The position location beacon 120 embodiment of FIG. 3 can be, for example, any of the position location beacons 120a-120n in the position location system 100 of FIG. 1.

The position location beacon 120 includes an orthogonal signal generator 310 coupled to a modulator 320. The orthogonal signal generator 310 can be configured to generate the subset of frequencies used by the position location beacon 120. A modulation data module 324 is also coupled to the modulator 320 and supplies the binary (or other) sequence used to modulate the orthogonal carriers. That is, the phase and/or amplitude of each carrier is altered in accordance with an element of the sequence.

The modulated output of Q/M carriers from the modulator 320 is coupled to an input of an OFDM modulator 330 that can be configured to generate the OFDM symbol corresponding to the modulated carriers. The OFDM symbol output from the OFDM modulator 330 can be coupled to a Digital to Analog Converter (DAC) 340 where a digital representation of the signal is converted to an analog representation.

The output of the DAC 340 can be coupled to a transmitter 350 where the OFDM symbol is frequency converted to a broadcast band. The output of the transmitter 350 can be coupled to an antenna 360 for broadcast.

The orthogonal signal generator 310 can be configured to generate all of the orthogonal carriers defined in the overall signaling bandwidth. The orthogonal signal generator 310 may generate, for example, all of the orthogonal carriers and pass only those corresponding to the desired subset of frequencies and filtering out the others. Alternatively, the orthogonal signal generator 310 may be configured to generate a subset of orthogonal frequencies including at least the subset of orthogonal frequencies associated with the position location signal broadcast by the particular position location beacon 120. The orthogonal signal generator 310 can be configured to filter out any carriers that are not part of the assigned frequency subset prior to outputting the carriers to the modulator 320. The orthogonal signal generator 310 may be configured to alter the assigned frequency subset from one OFDM symbol period to the next, or it may be configured to leave the assignment unchanged.

As described earlier, the modulator 320 can be configured to modulate each of the carriers in the subset with data supplied by the modulation data module 324. In one embodiment, the modulation data module 324 is configured to supply a pseudorandom sequence, such as a Gold code with a length extended, or truncated, to Q/M, to the modulator 320. The modulator 320 can be configured to modulate a phase of each of the carriers in the subset of carriers based on a corresponding bit value in the pseudorandom sequence. For example, the modulator 320 can be configured to Binary Phase Shift Key (BPSK) modulate the carriers based on the values of the pseudorandom sequence. Alternatively it may be configured to provide Quaternary Phase Shift Keying (QPSK), higher order phase shift keying, quadrature amplitude modulation (QAM) or other forms of modulation, based upon the values of a pseudorandom, or other prescribed numerical sequence.

As a simple example, the modulator 320 can be configured to modulate a carrier with a first phase, such as 0 degrees, in response to a "1" in the pseudo random sequence. The modulator 320 can also be configured to modulate a carrier with a second phase, for example 180 degrees, in response to a "0" in the pseudorandom sequence. Therefore, if the modulation data module 324 supplies a pseudorandom sequence of "0110" to the modulator 320 for the embodiment where Q/M=4, the modulator phase may modulate the first and fourth carriers to 180 degrees and phase modulates the second and third carriers to 0 degrees. In effect, each of the carriers is phase modulated with a constant value over one (or more) OFDM symbol periods.

The finite number (M) of different frequency subsets may result in the need to reuse the same frequency subset for more than one beacon within the position location system. The system may implement some manner of frequency subset reuse plan to alleviate the effects of such duplication. The position location beacons assigned the same frequency subset may also be assigned different pseudorandom modulation codes in order to provide a receiver with some ability to distinguish them.

The OFDM modulator 330 can be configured to convert the phase (or phase and amplitude) modulated subset of frequencies to an OFDM symbol. An embodiment of the OFDM modulator 330 can include an Inverse Fast Fourier Transform (IFFT) module 334 configured to convert the orthogonal frequencies to a time domain symbol. The IFFT module 334 can be configured to perform the transformation on the entire set of orthogonal frequencies, although only a subset of frequencies contains information. If an IFFT module is used, it typically produces a basic symbol of duration equal to the reciprocal of the frequency line spacing. Often, the basic symbol is extended to transmitted symbol duration by means of cyclic extension, which could be considered to be part of the IFFT processor 334. The output of the IFFT module 334 can be coupled to a parallel to serial converter 338 to convert the parallel generated time domain symbols from the IFFT module 334 to a serial format. Other non-FFT implementations may be more cost effective, particularly if the number of assigned frequencies is small. For example the OFDM symbol may be constructed by modulating the outputs of a series of digital oscillators. These oscillators may be implemented by a number of means such as numerically controlled oscillators.

The various modulation elements 310, 320, 330, 324 may be timed with respect to one another and with respect to other events (for example absolute time) by means of a system clock 370, which in turn receives timing information from an external source. In particular this external source may take the form of a signal from a GPS receiver or from other terrestrial and/or space borne timing sources. By this means the position location beacons may synchronize the times of transmissions of their OFDM symbols to one another, which in turn improves the orthogonality of their transmissions relative to one another.

The operation of the position location beacon 120 can be illustrated with a system example. As noted earlier, it may be advantageous for the overall signaling bandwidth to be relatively wideband to facilitate time resolution in the receiver. Additionally, it may be advantageous to implement the position location system within an existing communication system.

In one embodiment, the position location system can be implemented within a television broadcast system. Television broadcast systems are already widely supported and provide extremely high transmit powers that span numerous relatively wideband channels. The position location signal can be periodically substituted for a normal television broadcast signal. Similarly the position location signal may be periodically substituted for other signals associated with wideband broadcast systems transmitting video, audio or other information with high information content.

AN EXAMPLE

In a typical wideband broadcast system embodiment, Q=4096 orthogonal carriers can be defined within a 5.5 MHz frequency span that fits nicely with a typically allotted 6 MHz TV broadcast channel. This allocation of carriers results in a carrier spacing of approximately 1.343 kHz.

If M=8 different position location signals are configured, each position location signal includes a subset having Q/M or 512 carriers. Each position location beacon 120 can be assigned one of the eight carrier subsets.

The orthogonal signal generator 310 can be configured to generate at least the 512 orthogonal carriers needed for a position location signal. The 512 orthogonal carriers are then provided to the input of the modulator 320. The modulation data module 324 is configured to provide the modulator 320 a pseudorandom binary sequence, such as a Gold code with a length extended to 512 bits if required (full Gold code lengths are $2^n-1$, where n is an integer, for example, for n=9 the length is 511). The modulator 320 can be configured to phase modulate each of the 512 carriers based on the value of a corresponding bit in the length extended Gold code. The OFDM symbol period should be at least 1/1.343 kHz=745 microseconds. Extending the period beyond this duration is, in effect, a cyclic extension of the OFDM symbol since the composite OFDM basic repeats in time after 0.745 microseconds, in this example. Such cyclic extension allows for large differential delays to be observed by a mobile station receiving signals from a multiplicity of beacons; yet orthogonality may still be maintained over the time interval of 745 microseconds.

The 512 phase modulated carriers output from the modulator 320 are coupled to an OFDM modulator 330. An IFFT module 334 within the OFDM modulator 330 can perform a 4096 point IFFT operation. Although the IFFT module 334 can be configured to perform a 4096 point IFFT, the 512 orthogonal carriers of the active subset may be the only frequency bins having any nonzero signal component. The corresponding 4096 bin output from the IFFT module 334 can be coupled to a parallel to serial converter 338. The parallel to serial converter 338 may include two parallel to serial converter circuits because the IFFT typically produces complex data—that is, in phase and quadrature data streams, which are sent to a pair of DACs.

The serial outputs can be coupled to a pair of DACs 340 and transmitter 350 which is coupled to an antenna 360, which may be positioned on a broadcast tower that is itself positioned on a geographic high point. The transmitter 350 can be configured to periodically broadcast the position location signals. The transmitter 350 itself typically includes a quadrature modulator and additional upconversion and amplification circuitry to provide the transmitted signal at an appropriate final RF frequency and with requisite RF power.

The transmitter 350 can be configured to broadcast the position location signal as an OFDM symbol that occurs once per predefined repetition period. Periodic transmission allows the position location signaling to be multiplexed with signals of existing communication systems. The repetition rate can be, for example, once per second or once per quarter of a second. Better performance may be achieved, at a cost of reduced efficiency of the underlying communication system, by sending the position location symbols more often.

The position location beacon 120 can be configured to allow for position location in the presence of large differential delays between the signals from the various position location beacons and the receiver. As indicated above, the position location beacon 120 can be configured to append a cyclic prefix to the data by incorporating a cyclic extension approach in order to handle large differential path delays. Various approaches can be used, such as applying cyclic prefixes or suffixes to the data. For simplicity the following discussion assumes use of cyclic prefixes.

In the above embodiment having 5.5 MHz bandwidth and 4096 carriers, the position location (basic) symbol is approximately 745 μsec in length without the cyclic prefix, and can be increased beyond this in length including the prefix. At the receiver a portion of data of length 745 μsec is retained and processed, thus providing full sensitivity allowing for differential delays up to the length of the cyclic prefix extension. Longer differential delays may be processed, but there would be a loss in sensitivity.

The position location ranging signals transmitted by a position location beacon 120 may be configured for very long delays, in order to accommodate reception of signals from beacons over a wide geographical area. With sufficient transmit power, it is possible to achieve a good probability of detection for beacon signals transmitted at ranges in excess of 200 km, which corresponds to a delay of about 667 microseconds. In order to achieve this range with no loss in sensitivity, the cyclic prefix would need to be 667 microseconds, thus extending the transmitted symbol period to 745+667=1412 microseconds. If smaller ranges are acceptable, then a shorter transmitted symbol period may be allowable. Of course, when receiving and processing the OFDM symbol, the receiver integrates the received signal over a 745 μsec period.

In some situations, the position location signaling is time shared with communication signaling. Then it is desirable that the numerology of the two transmission types (communications and position location) be commensurate. Typically, however, the range requirements of the communication system are less. For example, in the prior example, with 745 μsec period per basic OFDM symbol (not including cyclic prefix), assume that a cyclic prefix of 55 μsec is used for communications purposes, thus producing a 800 μsec transmitted symbol period. The 55 μsec prefix may not be long enough to accommodate the differential delays between beacons for position location purposes, although it may be perfectly adequate for communications purposes. This is due to the fact that for communication purposes, the receiver need only communicate with one transmitter, whereas for position location purposes the receiver should be capable of concurrently receiving signals from three or more transmitters (beacons). In this case one approach would be to increase the cyclic prefix such that the transmissions employed for position location equal two or more transmitted symbols, for example 1600 μsec in this example. This would imply a cyclic prefix of duration 1600−745=855 μsec, which would allow for processing of signals transmitted from ranges up to 256 km. However, it is easy to see that the unambiguous range corresponds to delays of from 0 to 745 μsec. Due to the repetition of the signaling waveform every 745 μsec, the receiver may not be able to discriminate between a signal received at time delay d or d+745 μsec. Normally, this ambiguity may be resolved by measuring the received signal power level. An extra delay of 745 μsec would typically greatly weaken a signal's received power, thus permitting ambiguity resolution via received power measurement.

In an alternative embodiment, where the transmitted symbol period is restricted to 800 μsec, the position location signal may be constructed from a subset of 2048 carrier signals spaced over the assumed 5.5 MHz passband; hence adjacent tones are spaced by 2.69 kHz. This corresponds to a basic cycle period of 1/2.69 kHz=or 372 μsec. In this case, since the assumed transmitted symbols are restricted to 800 μsec in duration, one sees that the cyclic prefix is in effect of length 800−372=428 μsec. This provides a range of up to about 128 km. A delay ambiguity of 372 μsec may result in this case.

In some embodiments, the subset of frequencies and pseudo random sequence provided by the modulation data module 324 are not varied. In these cases the OFDM symbol output from the OFDM modulator 330 will also remain the same. In these cases, the orthogonal signal generator 310, modulator 320, modulation data module 324 and OFDM modulator 330 can be replaced by a module that stores and periodically provides the same OFDM symbol associated with the position location beacon 120.

Figure 4:
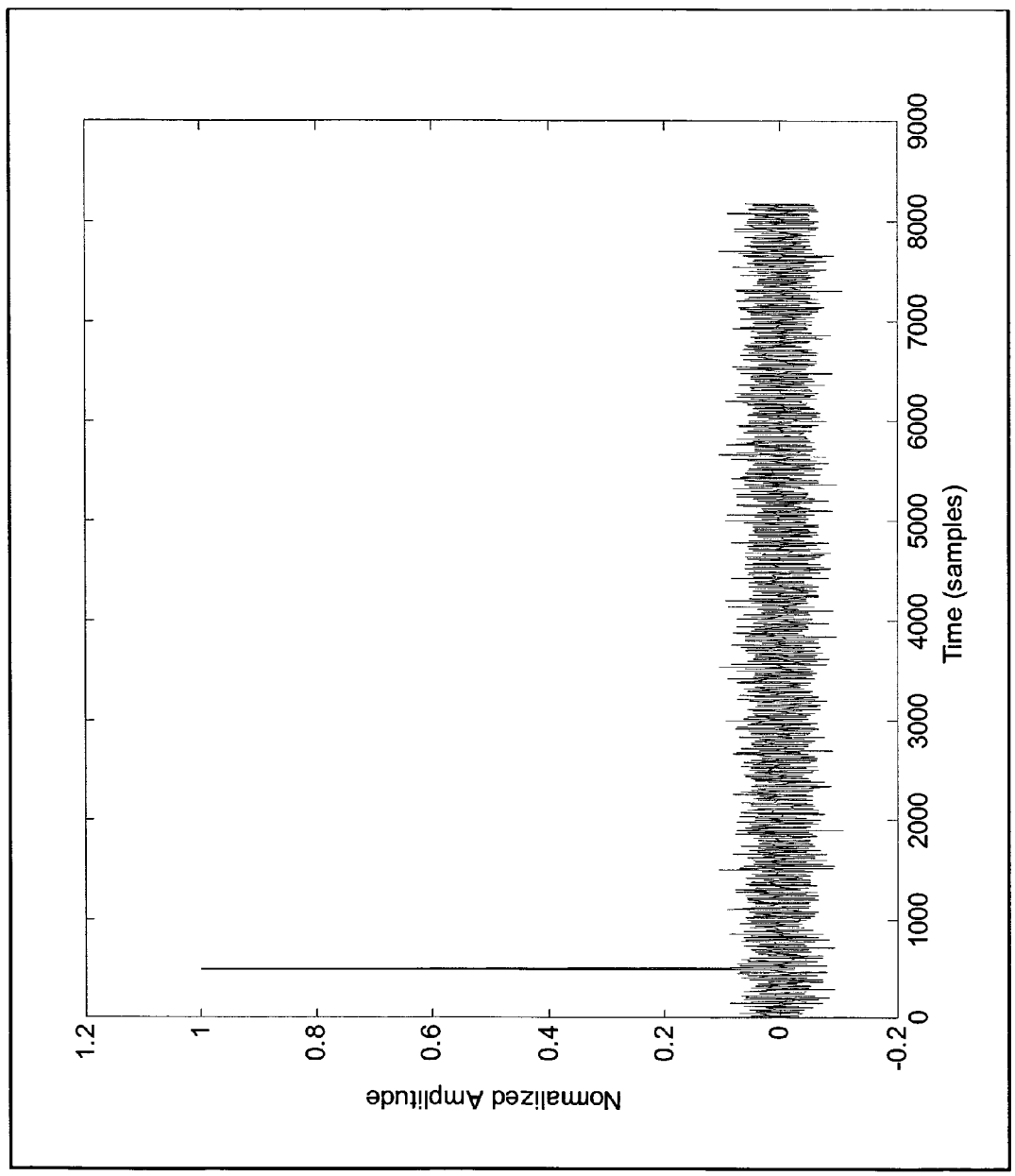
FIG. 4 is a plot of normalized autocorrelation for a position location signaling embodiment.

FIG. 4 is a plot of normalized autocorrelation for a position location signaling embodiment. The performance is shown for a position location signal generated using Q=4096, M=8, and a Doppler shift of 50 Hz. The RMS circular autocorrelation sidelobes for each of the position location signals is down from the mainlobe by a factor of $(Q/M)^{-0.5}$. For example, if Q=4096 and M=8, the autocorrelation sidelobes are down by 1/sqrt(512), or about −27 dB.

Figure 5:
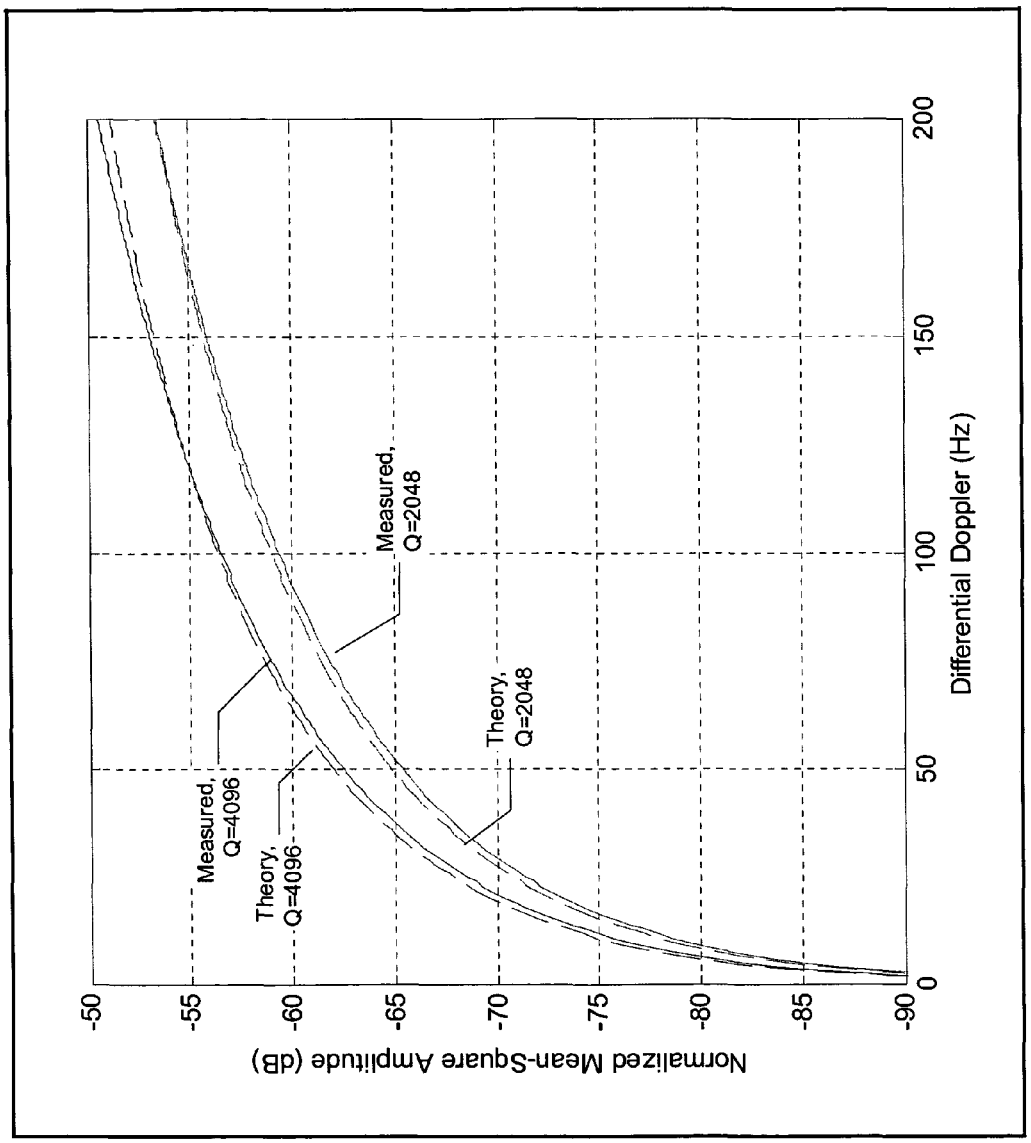
FIG. 5 is a plot of cross correlation with respect to frequency offset for a position location signaling embodiment.

FIG. 5 is a plot of cross correlation between two different OFDM symbols with respect to frequency offset for a position location signaling embodiment. The frequency offset is typically due to Doppler shift associated with the motion of the receiver. FIG. 5 shows curves plotted for two different position location signaling configurations. A first configuration includes Q=4096 and M=8 and a second configuration includes Q=2048 and M=8. With zero Doppler, the circular cross correlation of the different multiplexed position location signals is essentially zero. With nonzero Doppler, the cross correlation performance is attributable to a number of factors. The cross correlation rejection is partly attributable to the minimum frequency separation of the signal sets, the embedded pseudorandom binary code assigned to the differing frequency components, and the fact that only a fraction of frequencies of an interfering signal are typically within a minimal distance from a frequency of a given position location signal, where the minimal distance is the carrier spacing.

An approximate formula for the cross-correlation rejection (in dB) is: $10 \times \log_{10}(\delta f \times T_f) - 10 \log_{10}(Q) + 3$, where $\delta f$ is the Doppler shift, or other frequency offset, $T_f$ is the reciprocal of tone spacing (the basic symbol length) and Q is as before the number of carrier tones. Note that the cross correlation rejection does not depend upon the number of multiplexed signals (M). This is contrast to the autocorrelation rejection whose sidelobe structure depends upon the number of channels. As seen in the plots of FIG. 5, the theory is within 1 dB of the measured over the entire range. The difference between measured and theory is probably dominated by errors in approximation.

The effects of Doppler on the cross correlation performance can be further reduced by generating position location signals utilizing only half of the available carriers. The cross correlation improvement is relatively small even though the lines are spread apart by a factor of two. The spaced carrier embodiment may be of interest because it can be configured to allow for large differential time delays by including a cyclic prefix of greater duration, while keeping the transmitted symbol duration the same.

The nature of FIG. 5 suggests a method of discriminating valid correlation peaks from spurious ones that might be caused by large Doppler shifts. First, it should be noted that a valid peak would have a correlation peak that varies as $20 \log 10(\text{sinc}(\delta f \times T_f))$. For most terrestrial cases of interest this variation is negligible. For example, if $T_f$=372 μsec, the variation for differential Doppler shifts in the range [−200 Hz, 200 Hz] is less than 0.1 dB. To determine if a received signal is a valid correlation peak or if it is a cross correlation peak, a receiver can vary the reference signal in frequency increments of $f_i$ over a specified maximum range, say [−200, +200 Hz]. If the correlation peak drops by greater than of equal to some predetermined amount, say 3 dB, then reject the peak as a cross correlation. For example, if $f_i$ were 50 Hz, then one of the sets of increments would cause the spurious frequency lines to be within 25 Hz of the nulls of the lines associated with the test signal. From FIG. 5 the rejection at 25 Hz offset for the Q=2048 case is approximately −71.4 dB. In effect then offsetting the receiver reference can extend the Doppler rejection to around −71.4+3=−68.4 dB, even for a relatively large Doppler range of [−200, +200] Hz.

Another way to formulate the above test is simply to perform the cross correlation operation for each of the test frequencies and then choose at each lag, the smallest magnitude of cross correlation, over the frequency range. The resulting set of data can then be used to perform a detection operation.

The cost of performing cross correlation by incrementing the frequency reference is a set of additional tests. In the above example nine tests are used to cover a Doppler span of [−200, 200] Hz. Often the processing burden is not too high if the requirement to perform position location occurs infrequently. In this case processing can be performed offline by a microprocessor or a Digital Signal Processor (DSP). Furthermore, the processing can be serialized over the set of frequencies and the set of candidate signals, and hence storage can be a minor issue. The effects of additive noise will not invalidate these tests because the noise peak amplitudes typically vary little over these frequency ranges. In principle, in addition to discriminating against false alarms, this method can be used to "null out" the contribution of interfering signals, and reveal the presence of a weak signal.

The cross correlation discrimination test should work well because in the majority cases of interest there should be at most one very strong signal that might cause detectable cross correlations. The cross correlation issue is primarily associated with the "near-far" type problem, which should typically be limited to one emanation from one strong beacon and perhaps multiple weak signals. For most cases of interest the interfering signal causing the major cross-talk situation is extremely strong, for example 50 or 60 dB above any detection threshold. Typically, such a signal is easily detectable.

Since the major interferer is likely to be very strong in power, the precise Doppler frequency of such a signal may also be measurable, by a number of methods, thus reducing the range over which the above discrimination test may be performed. For example following an initial detection, one can examine the signal amplitude at Doppler frequencies displaced from this value, for example at $\pm 1/(4T_f)$. These three amplitudes can then be used in a quadratic interpolation process to accurately determine the true Doppler. More optimal methods are also possible, at the expense of more computation. It can be shown that the optimal frequency estimator has an RMS value bounded below by the Cramer-Rao bound as:

$$\frac{\sqrt{12}}{2\pi T_f} \times \frac{1}{\sqrt{2SNR_{out}}} \approx \frac{0.39}{T_f \sqrt{SNR_{out}}}$$

where $SNR_{out}$ is $=2 E/N_0$ is the output signal-to-noise ratio (E is signal energy over $T_f$ and $N_0$ is two-sided noise density), measured at the peak of a matched filter's output.

A quadratic interpolation algorithm provides extremely good performance. Using this process, the resulting Doppler estimates can be generated and have RMS errors of 10.2 Hz and 1.1 Hz for the 60 dB and 40 dB $SNR_{out}$ situations respectively.

Hence, if the strong beacon signal has 60 dB output SNR, a receiver can likely estimate its Doppler to an accuracy of around 1 Hz. This may eliminate the requirement to step through the Doppler band, as indicated above. However, there are various effects that may limit such an accurate estimate, including the presence of smaller multipath reflections having differing Doppler shifts, presence of other interfering signals, computational limitations, and other factors.

Figure 6C:
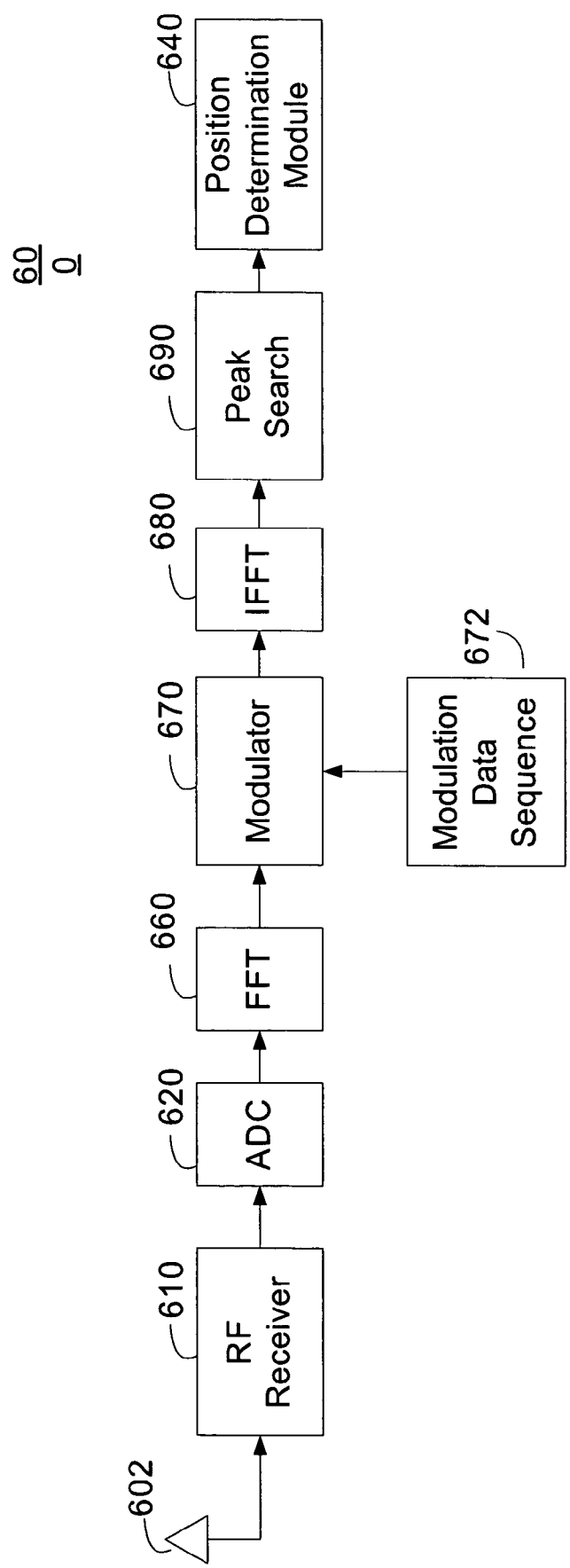

FIGS. 6A-6C provide embodiments of receivers 600 that can be used to receive the position location signals generated by the position location beacon 120 of FIGS. 1 and 3. FIG. 6A is a functional block diagram of an embodiment of a position location receiver 600 configured to detect the broadcast position location signals using a correlator 630. The position location receiver 600 can be implemented, for example, within a mobile station, such as the mobile device 110 of FIG. 1.

The position location receiver 600 includes an antenna 602 configured to receive one or more signals in one or more frequency bands. For example, the antenna 602 can be configured to receive position location signals from a position location beacon 120 at a first frequency band and a position location source in a second communication system at a second frequency band, such as from the base stations 130a-130b shown in FIG. 1.

The antenna 602 is coupled to an RF receiver 610 that can be configured to amplify, filter, and frequency convert the received wireless signal to, for example, a baseband signal. Because the beacons may transmit the position location signals as a burst that is time multiplexed with other communications, the RF receiver 610 can be configured to receive signals during a time allocated to position location signals. The RF receiver 610, and succeeding circuitry 630, 632 and 640, may be synchronized to a time reference that is also used by the position location beacons. The output of the RF receiver 610 can be coupled to an Analog to Digital Converter (ADC) 620 that is configured to convert the signal to a digital representation. The output of the ADC 620 can be coupled to buffer memory or register bank 624. The memory 624 can be configured to store the received position location signal for further processing.

The receiver 600 can be configured to perform signal detection, cross correlation rejection and Doppler processing in the manner described above. The output of the memory 624 can be coupled to a correlator 630. An OFDM symbol generator 632 can be coupled to another input to the correlator 630. The OFDM symbol generator 632 can be configured to generate each of the position location symbols that are broadcast by the position location beacons. Additionally, the OFDM symbol generator 632 can be configured to generate frequency offset versions of the position location signals to assist in cross correlation rejection and Doppler determination. In the case where the carriers used in the various position location signals are not varied and where the carriers are not modulated with time varying data, the OFDM symbol generator 632 may be configured to retrieve copies of previously generated symbols and need not utilize computational circuitry to generate the symbols for each correlation.

The correlator 630 can be configured to correlate the received signal against the symbols generated by the OFDM symbol generator 632. The correlator 630 can be configured to successively correlate the input data against each candidate OFDM symbol or it can perform the correlation operations simultaneously or otherwise perform the correlation functions concurrently. Because the position location beacons may burst the position location signals, the correlator 630 need not perform the correlation functions real time, and may perform the correlation functions during the period of time in which the position location beacons are not broadcasting position signaling. The memory serves the function to hold a burst of signal energy that is used in this non realtime correlation process.

The correlator 630 typically performs correlation operations against the input signal for each of a series of assumed time-of-arrivals, sometimes called "lags." The resulting series of numbers is called a "sample cross-correlation function". Hence the correlator 630 typically provides to the succeeding circuitry sample cross-correlation functions for each candidate OFDM symbol and perhaps for a multiplicity of assumed Doppler frequencies as well. Often the inputs to the correlators 630 are two data streams, an I and Q data stream, corresponding to in phase and quadrature signal tributaries. In this case the correlators typically produce sample cross-correlation functions that also contain I and Q streams, or tributaries. One often considers these I and Q streams as a single complex data stream. Often an envelope detection or magnitude-squared operation is performed upon this complex data stream, thus providing a single real data stream upon which succeeding operations (such as signal detection) are performed.

The output of the correlator 630 can be coupled to a position determination module 640. The position determination module 640 can be configured to perform a portion of a position location operation or may perform an entire position location operation based at least in part on the output of the correlator 630. In one embodiment, the position determination module 640 can be configured to determine the location of the receiver 600 by performing trilateration to the originating position location beacons. In other embodiments, the position determination module 640 can be configured to perform a portion of the position location operation. For example, the position determination module 640 can be configured to determine pseudoranges corresponding to the each of the received position location signals. The position determination module 640 can then communicate the pseudoranges to a remote processor or server that is configured to determine the location of the receiver 600. The position determination module 640 can, for example, transmit the pseudoranges to a server that is part of a position location module, for example 140 from FIG. 1, within a communication system separate from the communication system that is used to generate the position location signals.

Another functional block diagram of an embodiment of a receiver 600 is shown in FIG. 6B. The receiver 600 includes an antenna 602 coupled to an RF receiver 610 as in the previous embodiment. The output of the RF receiver 610 can be coupled to a matched filter module 650. The output of the matched filter module 650 can be coupled to a peak detection module 652 that is configured to determine whether the magnitude of the matched filter output exceeds a predetermined threshold. The output of the peak detection module 652 is coupled to a position determination module 640. The matched filter produces a sample cross-correlation function that is mathematically equivalent to that provided by the correlators 630; however, it performs this function by means of filtering methods, as are well known in the art.

The matched filter module 650 can include one or more matched filters configured to detect the position location signals. In one embodiment, a plurality of matched filters is configured in parallel, with each of the matched filters tuned to a specific position location symbol or a Doppler shifter version of the position location symbol. The impulse response of the matched filter is the time-reversed conjugated version of the position location symbol. In another embodiment, the matched filter module 650 includes at least one reconfigurable filter. The reconfigurable filter is successively tuned to match one of the position location symbols or Doppler shifted symbols. The received signal is then provided to the reconfigurable filter. The matched filter module 650 can also include a combination of fixed filters and reconfigurable filters.

In one embodiment discussed above, the received data consists of a block of data of length 372 microseconds with an unknown carrier phase transmitted each 0.86 seconds. The optimum detection approach, assuming AWGN and ignoring multipath effects, is to pass the signal through a matched filter module 650, compute the magnitude of the signal, and look for a peak above a threshold using the peak detection module 652. The threshold can be set based upon a prescribed false alarm rate. If the receiver 600 is configured to search over 8 different signal types, and Q/M=256 (Q=2048, M=8), then there are 2048 independent hypotheses. It may be desirable to achieve a false alarm rate of no more than one false alarm every hour (3600 seconds). This rate translates to a false alarm rate per hypothesis on the order of $0.86/(2048 \times 3600) \approx 10^{-7}$.

For a threshold k, the false alarm rate is approximately $\exp(-T^2/P_N)$, where $P_N$ is the power of the noise in the post processed bandwidth (the mean of the sum of the squares of the I and Q variances following the matched filter). This implies that the threshold should be set to about 12 dB. To further reduce false alarms, the receiver 600 may require at least two successive detections be achieved on successive transmissions and the maximum expected Doppler.

FIG. 6C is another embodiment of a receiver 600. The receiver 600 implements FFT techniques to detect the position location symbols. In effect, the FFT method is an efficient means toward implementing a matched filter. A signal processor can be configured to perform an FFT method to select and appropriately weight the various spectral components, according to the hypothesized references. An inverse transform then produces the matched filtered data. A feature of this approach is that a single forward transform of the received data may be employed. Multiple inverse transforms are required, one for each reference signal to be tested. Additional inverse transforms may also be used to detect Doppler shifted symbols.

The receiver 600 embodiment of FIG. 6C can include an antenna 602 coupled to an RF receiver 610. The output of the RF receiver 610 can be coupled to an ADC 620 that is configured to convert the received signal to a digital representation. The output of the ADC 620 can be coupled to an FFT module 660 that is configured to perform a forward FFT on the received signal. The FFT module 660 can be configured, for example, to perform the inverse operation of that used in generating the position location symbol at the beacon. For example, the FFT module 660 can be configured to perform an FFT having a number of bins corresponding to the total number of orthogonal carriers (Q).

The output of the FFT module 660 can be coupled to a modulator (or multiplier) 670. A modulation data module 672 can provide a binary (or other) sequence to the modulator 670. The binary sequence is typically identical to the binary sequence used to modulate the carriers in the position location signal beacons. If the original position location beacon utilized a more complicated sequence, then the modulator would typically provide a sequence of numbers which are the complex conjugates of the original complex sequence. Notice that this sequence of numbers is indexed by carrier frequency number, not by a time index.

The modulator 670 can be synchronized with the modulation data module 672 to apply a hypothesized reference to the results of the forward FFT module 660. For example, the modulator 670 can be configured to weight the output of the FFT module 660 to match those of a particular position location symbol. The modulation data module 672 can likewise be configured to provide the binary (or other) sequence associated with the same position location symbol. The modulator 670 and modulation data module 672 can be configured to repeat the process for a hypothesis corresponding to each of the position location symbols.

If phase modulation is used to modulate the data in the position location beacons, the modulator 670 effectively operates to remove the phase modulation on the subset of carriers to generate a subset of unmodulated carriers. If binary phase shift keying was originally used, then the phase removal is identical to series of 180 degree phase reversals. If higher order phase shifting was used, then the phase shifts applied to the various carriers is simply the negative of the phase shifts applied to the originating carriers. If phase and amplitude modulation (e.g. QAM) is used, then the amplitude modulation is the same as in the originating sequence, but the phase is again the negative of the phase shift of the originating sequence.

The output of the modulator 670 can be coupled to an Inverse FFT (IFFT) module 680. The IFFT module 680 can perform an IFFT operation on the transformed received signals. The IFFT module 680 is typically of the same order as the FFT module 660. The output of the IFFT module 680 can produce a correlation peak when the hypotheses match the received position location signals. That is, the presence of a peak indicates that the OFDM symbol hypothesis and Doppler hypotheses are valid (or at least are approximately correct). In addition the location of the peak relative to the beginning of the data series indicates a relative time-of-arrival of the signal from the corresponding beacon. Often the IFFT module will perform a magnitude or magnitude-square operation upon the inverse transformed data series, and it is this processed data that is typically used in the peak search and detection operation.

The output of the peak detection module 690 can be coupled to a position determination module 640. Thus, in an alternative to performing direct time domain based correlation as in the embodiments of FIGS. 6A and 6B, the receiver 600 can utilize frequency domain methods to correlate the received signals to the position location symbols using a combination of the FFT module 660, modulator 670, IFFT module 680 and peak detection module 690.

In order for the receiver 600 to support concurrent processing of position location beacon signals from a range of several kilometers through 120 km, the receiver 600 typically needs around 55 dB of dynamic range. That is, signals should be detectable and well above quantization noise effects. If the receiver 600 requires at least 15 dB output SNR, the quantization noise floor after the correlation processing should be about 70 dB below the maximum correlation peak. In the above embodiment, the integration time for the correlation process is set to 372 μsec. The effective processing gain is equal to the total number of tones, or 2048, which corresponds to approximately 33.1 dB. This implies that the signal-to-quantization noise ratio prior to the correlation process be around 70−33.1=36.9 dB. This may correspond to the desired ADC performance. The required performance depends upon the sample rate of the ADC the type of ADC.

The worst case situation occurs if the ADC is a flash ADC and if the filtering provided prior to the ADC is essentially a brick wall type filter. In this case filtering between the ADC and correlation operation will not improve the SNR. A q bit ADC has approximately $2^q$ levels. Depending upon the encoding, it may be $2^q-1$ or $2^q$. Suppose the RMS input signal level is set to 12 dB below the peak ADC output. This corresponds to an RMS of $1/4 \times (2^q/2) = 2^{q-3}$, assuming unity quantization step sizes. The RMS quantization noise due to an ideal quantizer with unity step size is $1/\sqrt{12}$ and hence the RMS signal to quantization noise is $20 \log_{10}(2^{q-3} \times \text{sqrt}(12))$. This is shown in the following table:

| No. Bits | RMS Signal to Quantization Ratio (dB) |
|---|---|
| 6 | 28.9 |
| 7 | 34.9 |

-continued

| No. Bits | RMS Signal to Quantization Ratio (dB) |
|---|---|
| 8 | 40.9 |
| 9 | 46.9 |
| 10 | 52.9 |

From this table, in order to achieve 36.9 dB Signal to Quantization noise the receiver 600 needs to have an 8 bit ADC. In some cases, however, this requirement may be relaxed, as indicated above, if, for example, the ADC sample rate is somewhat oversampled and the quantization noise extends beyond the signal passband. Then digital filtering can improve the effective signal strength. This is particularly the case for sigma-delta converters in which much of the quantization noise resides at the upper end of the passband defined by half the sample rate.

The above requirement upon ADC quantization accuracy can also be relaxed if a multiplicity of OFDM symbols are processed by any of the methods of FIG. 6A, 6B, or 6C and the results are combined prior to performing the peak detection. The combination may be done either prior to (coherent integration) or after (incoherent integration) a magnitude (or magnitude-squared) operation, depending upon whether continuous carrier phase may be maintained between the OFDM symbols being processed. If coherent integration is used, then the improvement in signal-to-quantization noise is proportional to the number of OFDM symbols combined. For example, if four symbols are combined the improvement is 6 dB, hence reducing the ADC quantization accuracy by one bit. If incoherent integration is used, then the improvement is less than linear. For example, for a required 12 bit output SNR, if four symbols are combined the improvement is approximately 5.1 dB (assuming $10^{-7}$ false alarm rate). Hence, for this case about 5 symbols must be combined with incoherent integration in order to reduce the ADC quantization accuracy by one bit.

As indicated earlier, the position location operation may be time multiplexed with a communication function. In particular the communication functionality may be one employing OFDM type modulation. A communication receiver demodulating an OFDM stream typically will perform a forward FFT as in 6C. However, it will then normally process in the frequency domain each of the carriers provided by the data out of 660 by demodulating the data present in each of these carriers. This is in contrast to the position location processing in which the data out of 660, following the modulation function of 670, undergoes an inverse transform to provide data in the time domain. Nevertheless the communication receiver can share the processing stages of 610, 620, and 660 in order to implement a very efficient combined communications and position location system.

Figure 7:
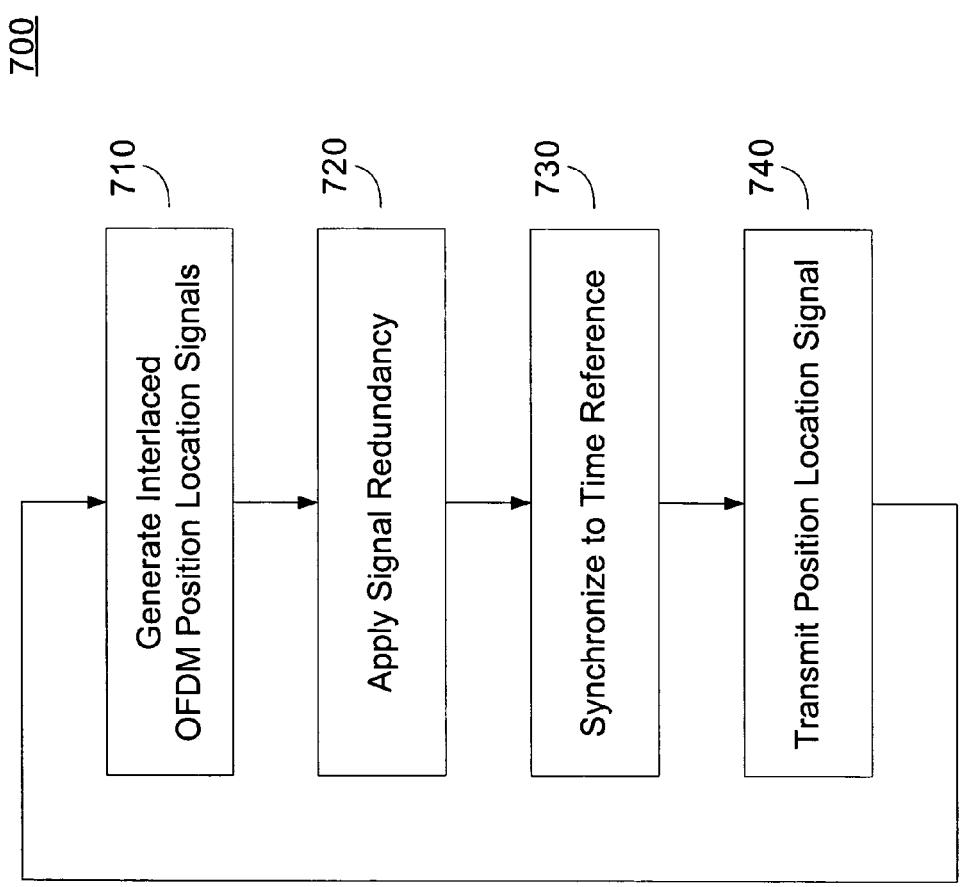
FIG. 7 is a flowchart of a method of generating position location signals.

FIG. 7 is a flowchart of an embodiment of a method 700 of generating position location signals. The method 700 can be performed by the position location beacons 120a-120n of FIG. 1 and FIG. 3.

The position location beacon processing can begin at block 710, which generates frequency interlaced OFDM position location signals. The position location beacon can generate one or more frequency interlaced OFDM signals, although typically, the position location beacon is assigned only one of the signals.

The position location beacon proceeds to block 720 and applies redundancy to the generated signal. As described above in one of the embodiments, the position location beacon may generate a (basic) symbol that is 372 μsec in length but may repeat the signal to generate a signal of 744 μsec in length. This acts as a cyclic prefix (or suffix) and permits a receiver to process received signals at long ranges from the beacon without sensitivity loss due to crosstalk from more nearby beacons. Of course much shorter or longer cyclic prefixes may be used depending upon the set of geographic ranges that need to be accommodated.

After applying the cyclic prefix, the position location beacon can proceed to block 730 and synchronize the position location signal to a time reference. As discussed earlier, the position location beacons should be synchronized to minimize position errors attributable to timing errors. The position location beacon may be synchronized to an external timing reference, such as GPS time or some other time reference. The position location beacon timing should be fixed relative to the other position location beacons and should be accurate to within 100 nsec and preferably accurate to within 50 nsec.

Once the position location beacon is synchronized to a time reference, the position location beacon can proceed to block 740 and transmit the position location signal at a predetermined time relative to the time reference. The position location beacon can then return to block 710 of the method 700 to repeat the process.

In some cases, the synchronization to the time reference operation of block 730 is done concurrently with the operations of 710 and 720, particular if the implementation of 710 and 720 is done in realtime with custom hardware. If instead, 710 and 720 are done in software, for example by pre-computing a set of data samples for later transmission, then the synchronization of this data to a time reference would occur when such a transmission is required, and the location of the synchronization function 730 is appropriate.

Figure 8:
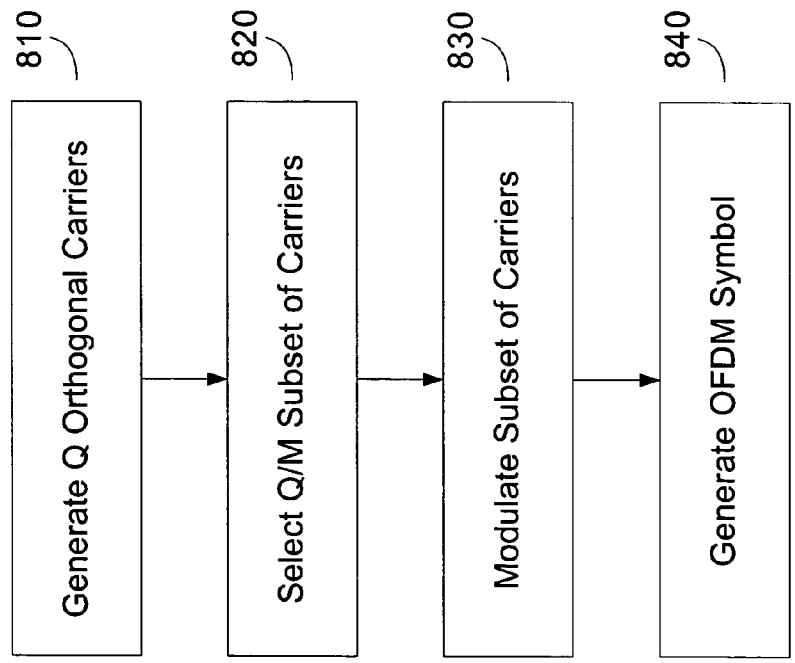
FIG. 8 is a flowchart of a method of generating frequency interlaced OFDM symbols.

FIG. 8 is a flowchart of an embodiment of the method 710 for generating frequency interlaced OFDM position location signals. The method 710 can form a part of the signaling flowchart of FIG. 7, and can be performed in a position location beacon, such as the one shown in FIG. 3.

The method 710 begins at block 810 where the position location beacon generates a plurality of orthogonal carriers, Q, that substantially span a channel bandwidth. As noted earlier, a wider channel bandwidth facilitates a sharp correlation peak in a receiver and allows for increased time resolution. In one embodiment, the channel bandwidth can be approximately 5.5 MHz wide. Embodiments discussed above have included Q=4096 and Q=2048, although the number of orthogonal carriers is not limited to a power of two.

After generating the Q orthogonal carriers, the position location beacon proceeds to block 820 and selects a subset (Q/M) of the orthogonal carriers. In one embodiment, the carriers in the subset are uniformly spaced throughout the channel bandwidth. In another embodiment, the carriers in the subset are randomly or pseudo randomly spaced. Normally, the number of carriers in each subset is chosen to be identical (that is, Q/M for M subsets). However, it is possible, and in some cases desirable, that the number of carriers in the M subsets may differ. In this case the number of carriers may be more or less than Q/M but each of the subsets should be disjoint in order to maintain orthogonality, and the sum of the number of carriers in all subsets should be Q or nearly Q. In some cases some of the carriers, particularly at the lower and/or upper ends of the band, may be left unused in order to provide a guard band that minimizes interference with adjacent signals. In some cases some of the carriers may be utilized for other purposes, such as synchronization, and hence may be unavailable for position location purposes.

It may be advantageous for each of the subsets to have carriers that are mutually exclusive of the other subsets. One of the frequency subsets can be assigned to each of the position location beacons in the position location system. Where there are more beacons than distinct subsets of carriers, the system may implement a reuse plan that minimizes the potential interference from position location beacons having like frequency subset assignments. In particular it may be advantageous for a beacon numbered M+1 to utilize a different subset of frequencies than any of the M distinct subsets mentioned above. Then, while the OFDM symbol from this additional beacon will have some degree of correlation with an OFDM symbol corresponding to one or more of the M subsets, this correlation may be low.

After the position location beacon selects or is otherwise assigned a subset of carriers, the position location beacon proceeds to block 830 and modulates the subset of carriers. In one embodiment, a pseudo random code, such as a Gold code of length Q/M is used as a data sequence to BPSK (or otherwise, for example, QAM) modulate the carriers. That is, the each carrier is modified in phase and/or amplitude in accordance with an element of such a data sequence. The pseudo random modulation data can be fixed or may vary over time. Typically, the modulation data sequence assigned to different subsets are chosen to be different. The different data sequences are typically chosen to have good cross correlation properties.

After modulating the subset of carriers, the position location beacon proceeds to block 840. In block 840 the position location module generates the frequency interlaced OFDM symbol corresponding to the interlaced and modulated carriers. For example, the position location beacon can generate the OFDM symbol using a IFFT module and parallel to serial converter.

In the above description of FIG. 8, it should be noted that the operations 810 to 830 may be viewed as simply constructing a series of Q complex numbers, one number per each carrier frequency. In this case, the operation 810 is simply the construction of an array of Q numbers, each of which may be initialized to value 0. The operation of 820 is the selection of the indices of the array corresponding to a carrier subset and that of 830 is the assignment of a phase and amplitude, or complex number, to each of the elements of the array. This array may then be appended with additional zero-valued samples at its beginning or end, in order to create an array with a desired length (e.g. 2048, 4096 or another power of two), and then the array may be operated upon with an inverse FFT (or mathematically equivalent) operation to produce the OFDM symbol as in 840.

Figure 9:
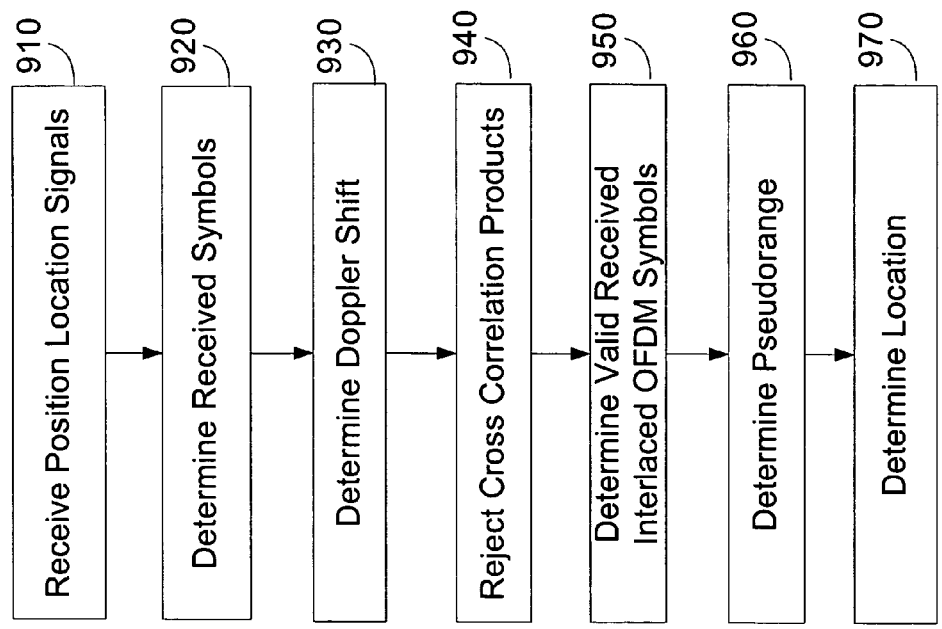
FIG. 9 is a flowchart of a method of position location using frequency interlaced OFDM symbols.

FIG. 9 is a flowchart of an embodiment of a method 900 of position location using frequency interlaced OFDM symbols. The method 900 can be performed, for example, in the receiver 600 embodiments shown in FIGS. 6A-6C.

The method 900 begins at block 910 where the receiver receives the position location signals. The receiver may be synchronized to the same time reference used to synchronize the beacons. Therefore, the receiver needs only tune to and monitor for position location signals during a predetermined period of time. The duration and duty cycle of the position location signals may be only a fraction of the time that the receiver is active in order to minimize the energy expended and processing required to support position location. This is particularly the case if the position location operation is time multiplexed with other operations, such as communication signal processing.

After receiving the position location signals, the receiver proceeds to block 920 and determines the received position location symbols present in the received position location signals. The determination can be a preliminary determination because some of the symbols may be rejected as cross correlation products.

In 920 the receiver can, for example, correlate the received signals to one or more reference symbols stored or generated within the receiver. In another embodiment, the receiver may pass the received signals through one or more matched filters corresponding to the position location symbols. In still another embodiment, the receiver may transform the signals to the frequency domain in an FFT, remove the modulation on the carriers, and transform the signals in an IFFT in order to determine the presence of particular position location symbols. As indicated previously, this FFT approach is particularly efficient if forward FFT processing is utilized as part of a combined communication system/position location system. Of course, the receiver may use some other embodiment for determining the presence of position location symbols.

After determining the presence of position location symbols, the receiver proceeds to block 930 and can determine a Doppler shift of the received signals using, for example, a quadratic interpolation that may be further corrected by applying a polynomial correction to the Doppler estimate. After determining the Doppler shift, the receiver can proceed to block 940 and reject the cross correlation products.

In one embodiment, the receiver shifts a frequency reference by a predetermined amount above and below a nominal frequency. The receiver can repeat the symbol determination for the frequency shifted reference. The receiver can reject symbols as cross correlation products for which a correlation peak drops by some predetermined amount, for example 3 dB or more.

After rejecting the symbols that are determined to be cross correlation products, the receiver can proceed to block 950 and can determine valid received frequency interlaced OFDM symbols corresponding to the position location beacons. These are basically the symbols determined via operation 920 minus those rejected in 940. In some cases some additional rejections are performed. For example, as indicated previously, there may be a time ambiguity present due to the use of a long cyclic prefix. This may result in an OFDM symbol appearing to be received at two or more different times (spaced by the transmitted symbol period). Criteria such as received power level may be used to perform such additional rejections.

The receiver can then proceed to block 960 and determine a time of arrival, or pseudorange, corresponding to each of the received OFDM symbols. The receiver may have knowledge of the time at which the symbols were transmitted. The receiver can determine a signal delay, with a bias due to any error present in its local clock, and thus determine a pseudorange to each of the transmitting beacons.

The receiver can then proceed to block 970 and determine its location, based at least ion part on the pseudoranges. The receiver may independently determine its position, or the receiver may transmit the pseudoranges to a position location module that determines the location of the receiver.

In one embodiment, the receiver receives geographical and other location information for the position location beacons over an overhead data channel. The receiver is then able to determine its position based on the beacon positions and corresponding pseudoranges. In another embodiment, the receiver transmits the pseudoranges to a position location module, such as a position location server that is part of a cellular telephone position location system. The receiver may transmit the information using a wireless transmitter that is part of a module device that houses the receiver.

Although a particular sequence of steps is shown in the flowcharts of FIGS. 7-9, the methods are not limited to the steps or sequence of steps shown in FIGS. 7-9. Additional steps or processes may be added to the methods and the additional steps or processes may be added between existing process steps. Moreover, some steps or process flows may be omitted from the method. For example, the method 700 shown in FIG. 7 may omit redundancy. As another example, the method 900 of FIG. 9 may omit the cross correlation rejection step.

A position location system, position location signaling, position location beacon and receiver have been disclosed. Additionally, methods for position location have been disclosed. A frequency interlaced OFDM position location signal can be generated from a set of orthogonal carriers spanning substantially a channel bandwidth. The position location signals can be generated by selecting a subset of the carriers. Each of the carriers in the subset of carriers can be modulated according to an element of a modulation data sequence. The modulation data sequence can be a pseudo random sequence such as a Gold code sequence and the carriers can be BPSK modulated with the data, or modulated with higher order modulation, such as QAM. In the latter case the elements of the modulating data sequence would have a higher order quantization than binary. For example the modulating sequence may contain a set of elements that are quantized to 3, 4 or more bits. The modulated subset of carriers can then be transformed to an OFDM symbol that is typically periodically transmitted. Multiple position location beacons can be synchronized to transmit the frequency interlaced OFDM symbols at substantially the same time. Improved interference rejection results from having the frequency subsets assigned to different beacons disjoint and designing the modulation data sequences of different beacons to have good cross correlation properties.

A receiver can receive the frequency interlaced OFDM symbols from one or more position location beacons and can determine which symbols were received. The receiver can then determine a pseudorange based in part on the received symbol. The receiver can then determine a location based on the pseudoranges.

A number of modifications are possible. For example, as indicated previously, in some cases different beacons may utilize different subsets of carriers, but the subsets may have some of the carriers in common, rather than being totally disjoint. This will cause some correlation to be present between the OFDM symbols provided by the different beacons, but this correlation may be minimized if the number of carriers in common is small.

The prior discussion focused upon situations in which the multiple position location beacons transmitted information in a time synchronized manner. In an alternative embodiment, the beacons need not be time synchronized, as long as the times of transmission of signals from the beacons may be ascertained. This may be done by the use of mobile or fixed monitoring equipment that can time tag the transmissions of signals from these beacons. For example, cellular telephone equipment (mobile or fixed) containing GPS receivers typically can determine accurately the time of day at such receivers, and hence, if in proximity to beacons, can provide time tagging of such transmissions. The relative timing of the beacon transmissions may then be sent to a receiver trilaterating from the beacon transmissions or to a server acting in conjunction with this receiver that participates in position location. If the beacons are not time synchronized then there is the potential that some of the orthogonality between their emissions of symbols will be lost. However, this problem may be avoided if the transmitted symbols are repeated a number of times, thus obviating the necessity for precise synchronization of such transmissions.

The above description is provided to enable any person skilled in the art to make or use the invention. Various modifications to the embodiments disclosed will be readily apparent to those skilled in the art, and the generic principles defined herein may be applied to other embodiments. Thus, the disclosure is not intended to be limited to the embodiments shown herein.

What is claimed is:

1. A method of transmitting position location signals in a wireless communication system, the method comprising:
   generating, by a first position location beacon, a first Orthogonal Frequency Division Multiplex (OFDM) symbol based, at least in part, on a first subset of orthogonal frequencies selected from a plurality Q of orthogonal frequencies, wherein the Q orthogonal frequencies are separated from one another by a multiple of a fixed frequency spacing w, wherein the first subset of orthogonal frequencies are associated with the first position location beacon that is in a first geographical location, and wherein the first position location beacon further comprises generating a nonbinary signal and modulating frequencies in the first subset of orthogonal frequencies based in part on the nonbinary signal, wherein the nonbinary signal comprises a constant signal over a period at least 1/w;
   generating, by a second position location beacon, a second Orthogonal Frequency Division Multiplex (OFDM) symbol based, at least in part, on a second subset of orthogonal frequencies selected from the plurality Q of orthogonal frequencies, wherein the first OFDM symbol is substantially orthogonal to the second OFDM symbol and wherein the second position location beacon is in a second geographical location that is distinct from the first geographical location, and wherein each of the first and second subsets of orthogonal frequencies comprise different randomly spaced orthogonal frequencies or pseudorandomly spaced orthogonal frequencies; and
   transmitting wirelessly from the first position location beacon, a first position location signal comprising the first OFDM symbol to a receiving mobile device; and
   transmitting wirelessly from the second position location beacon, a second position location signal comprising the second OFDM symbol to the receiving mobile device, wherein the first and second position location signals are transmitted and configured to allow the receiving mobile device to determine a time difference of arrival.

2. The method of claim 1, wherein the plurality Q of orthogonal frequencies comprises the plurality of orthogonal frequencies spanning substantially an entire channel bandwidth.

3. The method of claim 1, wherein the plurality Q of orthogonal frequencies comprises orthogonal frequencies spanning substantially 5.5 MHz.

4. The method of claim 1, wherein the first subset of orthogonal frequencies comprises:
   a number M of distinct position location signals; and
   Q/M of orthogonal frequencies from the plurality Q of orthogonal frequencies.

5. The method of claim 1, further comprising, with the first position location beacon:
   generating a binary data sequence; and
   modulating frequencies in the first subset of orthogonal frequencies based in part on the binary sequence.

6. The method of claim 5, wherein generating the binary sequence comprises generating a pseudorandom binary sequence.

7. The method of claim 5, wherein generating the binary sequence comprises generating a pseudo random binary sequence of a type selected from a group comprising a maximal length binary sequence, a Barker code, a Gold code, and a Walsh code.

8. The method of claim 5, wherein modulating each frequency in the first subset of orthogonal frequencies comprises phase modulating each frequency in the first subset of orthogonal frequencies.

9. The method of claim 1, wherein modulating each frequency comprises modulating one of a phase, amplitude, or combination of phase and amplitude.

10. The method of claim 1 wherein transmitting wirelessly the first position location signal comprises transmitting a first signal time synchronized to a first external event.

11. The method of claim 10, wherein transmitting wirelessly the second position location signal comprises transmitting a second signal time synchronized to a second external event.

12. The method of claim 1, wherein generating the first OFDM symbol comprises transforming the first subset of orthogonal frequencies to a time domain signal using an Inverse Fourier Transform.

13. The method of claim 1, wherein generating the first OFDM symbol comprises transforming the first subset of orthogonal frequencies to a time domain signal using a Q-point Inverse Fast Fourier Transform (FFT).

14. The method of claim 1, wherein transmitting wirelessly the first position location signal comprises periodically transmitting the first OFDM symbol using a television broadcast transmitter.

15. The method of claim 1, wherein a duration of said first OFDM symbol is substantially equal to 1/w.

16. The method of claim 1, wherein a duration of said first OFDM symbol is extended to be greater than 1/w.

17. An apparatus comprising:
   a signal generator to establish a first subset of orthogonal frequencies from a plurality Q of orthogonal frequencies, wherein each of the Q orthogonal frequencies is separated from one another by a multiple of a fixed frequency spacing w;
   a signal modulator to generate a first Orthogonal Frequency Division Multiplex (OFDM) symbol based on the first subset of orthogonal frequencies and substantially orthogonal to a second OFDM symbol generated from a second subset of orthogonal frequencies from the plurality of orthogonal frequencies, wherein each of the first and second subsets of orthogonal frequencies comprise different randomly spaced orthogonal frequencies or pseudorandomly spaced orthogonal frequencies, wherein the signal modulator is operatively enabled to generate a nonbinary signal, and modulate each frequency in the first subset of orthogonal frequencies based in part on the nonbinary signal, wherein the nonbinary signal comprises a constant signal over a period at least 1/w; and
   a signal transmitter to transmit a position location signal containing said first OFDM symbol from a first geographical location distinct from a second geographical location from which the second OFDM symbol is transmitted by another signal transmitter, and wherein the first and second OFDM symbols are transmitted and configured to allow a receiving mobile device to determine a time difference of arrival.

18. The apparatus of claim 17, wherein the plurality of orthogonal frequencies span substantially an entire channel bandwidth.

19. The apparatus of claim 17, wherein the signal generator is operatively enabled to establish a number M of distinct position location signals, and select Q/M of orthogonal frequencies from the plurality of orthogonal frequencies.

20. The apparatus of claim 17, wherein the signal modulator is operatively enabled to generate at least one of a binary data sequence and/or a pseudo random binary sequence, and modulating frequencies in the first subset of orthogonal frequencies based in part on one of the binary sequence or the pseudo random binary sequence.

21. The apparatus of claim 17, wherein the signal modulator is operatively enabled to modulate at least one of a phase, an amplitude, or a combination of the phase and the amplitude.

22. The apparatus of claim 17, wherein a signal transmitting circuitry comprises a television broadcast transmitter.

23. The apparatus of claim 17, wherein a duration of said first OFDM symbol is substantially equal to 1/w.

24. The method of claim 17, wherein a duration of said first OFDM symbol is extended to be greater than 1/w.

25. An apparatus comprising:
  means for establishing a first subset of orthogonal frequencies from a plurality Q of orthogonal frequencies, wherein each of the Q orthogonal frequencies are separated from one another by a multiple of a fixed frequency spacing w;
  means for generating a first Orthogonal Frequency Division Multiplex (OFDM) symbol based on the first subset of orthogonal frequencies and substantially orthogonal to a second OFDM symbol generated from a second subset of orthogonal frequencies from the plurality of orthogonal frequencies, wherein each of the first and second subsets of orthogonal frequencies comprise different randomly spaced orthogonal frequencies or pseudorandomly spaced orthogonal frequencies;
  means for generating a nonbinary signal, wherein the nonbinary signal comprises a constant signal over a period at least 1/w;
  means for modulating frequencies in the first subset of orthogonal frequencies based in part on the nonbinary signal; and
  means for transmitting a position location signal containing said first OFDM symbol from a first geographical location distinct from a second geographical location from which the second OFDM symbol is transmitted by a transmitter located at the second geographical location, and wherein the first and second OFDM symbols are configured to allow a receiving mobile device to determine a time difference of arrival.

* * * * *